United States Patent [19]
Wright et al.

[11] Patent Number: 5,839,054
[45] Date of Patent: Nov. 17, 1998

[54] AUTOMATIC REGISTRATION PAGING SYSTEM

[75] Inventors: Christopher B. Wright, San Francisco; Stephen D. Bristow, Los Altos, both of Calif.

[73] Assignee: Brother International Corporation, Somerset, N.J.

[21] Appl. No.: 581,932

[22] Filed: Jan. 2, 1996

[51] Int. Cl.$^6$ ........................................ H04Q 7/08
[52] U.S. Cl. ........................... 455/31.2; 370/313; 379/93
[58] Field of Search .................... 455/31.1, 31.2, 455/31.3, 70, 425, 411, 445; 340/825.44, 311.1

[56] References Cited

U.S. PATENT DOCUMENTS

| | | |
|---|---|---|
| 4,453,040 | 6/1984 | Wolf et al. . |
| 4,940,963 | 7/1990 | Gutman et al. .......................... 370/313 |
| 5,040,204 | 8/1991 | Sasaki et al. . |
| 5,065,423 | 11/1991 | Gaskill ...................................... 379/57 |
| 5,128,980 | 7/1992 | Choi . |
| 5,148,469 | 9/1992 | Price . |
| 5,202,912 | 4/1993 | Breeden et al. . |
| 5,307,399 | 4/1994 | Dai et al. . |
| 5,357,566 | 10/1994 | Dowling, Jr. et al. . |
| 5,416,827 | 5/1995 | Gaskill . |
| 5,459,458 | 10/1995 | Richardson et al. . |
| 5,526,401 | 6/1996 | Roach, Jr. et al. . |
| 5,541,976 | 7/1996 | Ghisler . |
| 5,581,595 | 12/1996 | Iwashita ...................................... 379/57 |
| 5,583,921 | 12/1996 | Hidaka ...................................... 379/93 |

*Primary Examiner*—William Cumming
*Attorney, Agent, or Firm*—Oliff & Berridge, PLC

[57] ABSTRACT

A dedicated paging system having single button paging, requiring only a single press of a dedicated button on a page base to automatically page a pager associated with the page base. Information associating the page base with the pager is stored in the page base and/or a database maintained by a paging service provider with which the paging system is registered. When the dedicated button on the page base is pressed, the page base automatically calls the paging service provider. The paging service provider strips the caller identification number from the incoming call, uses the number to look up the pager identification number stored in the database, and then uses the retrieved pager identification number to send a page signal to the pager. Additionally, the paging system is automatically registered with a single press of the button. When the button is pressed, the page base automatically calls a clearinghouse. The page base uploads a pager identification number to the clearinghouse, and the clearinghouse downloads a paging service provider access telephone number to a memory within the page base. The clearinghouse stores the pager identification number and the caller identification number of the telephone line the page base is using in the paging service provider database. Where possible, the clearinghouse also uses the caller identification number to automatically access billing information associated with the number and set up a billing account for the paging service.

42 Claims, 19 Drawing Sheets

AUTOMATIC REGISTRATION PAGING SYSTEM

BACKGROUND OF THE INVENTION

1. Field of the Invention

This invention relates to paging systems using radio frequencies. More particularly, this invention relates to a pager and a base unit which are dedicated to each other so that a single press of a button on the base unit causes the pager to be paged.

2. Background of Related Art

In a typical paging system, a user dials a special phone number to access the paging service provider, and then enters in information identifying the person or pager to be paged, and information identifying the person requesting the page. This is often done by either relaying the information orally to a human operator or by entering the information via a touch tone phone.

Such systems accommodate any user who knows the access phone number and the personal or pager identification of the person he is trying to reach. However, the paging process is cumbersome and requires the user to know and use different numbers for each person to be paged. In addition, the person receiving the page may not know immediately who is trying to page him, and accordingly, may not know how important the page request is.

SUMMARY OF THE INVENTION

Accordingly, this invention provides a pager and a base unit that will page the pager upon a single touch of a single button dedicated to that pager. The base unit may use public switched telephone network (PSTN) lines to automatically access a service provider that will in turn transmit a radio frequency signal to the pager.

Information linking the page base and the pager is stored in either the page base, a database maintained by a paging service provider, or both.

This invention also provides a single-button, automatic registration system for activating the dedicated pager system, and for automatically setting up and activating an associated billing account that automatically bills for paging services rendered.

Advantageous uses of the invention are readily apparent. For example, a couple leaving their child home with a babysitter could take a dedicated pager with them. In case of emergency, the babysitter could simply press the dedicated page button to page the couple, instead of having to use numbers which can be lost or forgotten in moments of panic.

In another situation, where a family has a page base with several dedicated pagers, each family member could take his or her dedicated pager when going out. Then, when someone at home needs to contact that family member, one press of the appropriate dedicated page button on the page base alerts the family member to call home.

BRIEF DESCRIPTION OF THE DRAWINGS

The invention will be described in detail with reference to the following drawings in which like reference numerals refer to like elements and wherein.

DETAILED DESCRIPTION OF THE INVENTION

Figure 1:
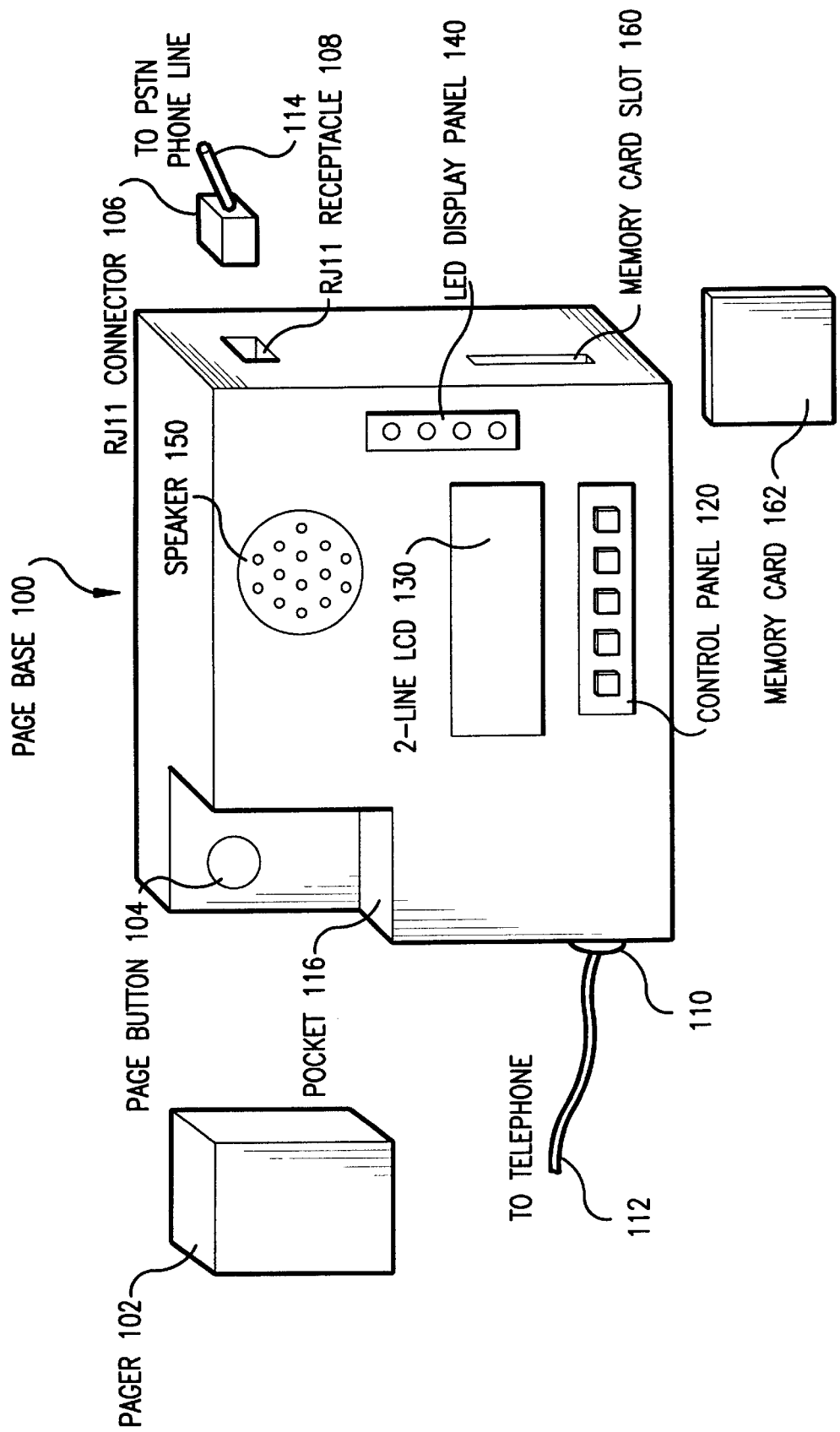
FIG. 1 shows a first preferred embodiment of a page base according to the invention.

FIG. 1 shows a first preferred embodiment of a page base according to the invention. In FIG. 1, a page base 100 has a page button 104 and a connection to a Public Switched Telephone Network (PSTN) line 114 via an RJ11 socket 108 and an RJ11 plug 106. A pager 102 associated with the page button 104 may be inserted into a pocket 116 in the page base 100 when not in use. When a user removes the pager 102, the page button 104 is exposed and may be actuated. Alternatively, the page button 104 could be appropriately located elsewhere on the page base 100, for example near the control panel 120. When the page button 104 is pressed, the page base 100 automatically triggers paging of the pager 102 by sending appropriate information through the PSTN line 114 to a paging service provider (not shown).

A light emitting diode (LED) display panel 140 indicates the status of the page base 100. In the first preferred embodiment of the page base 100, a first LED on the panel 140 is capable of flashing, emitting light continuously, and emitting light in either one of two colors. When the phone number the page base 100 dials to contact the paging service provider is busy, the first LED blinks red. When the paging service provider picks up the line, the first LED blinks green. After the page base 100 has successfully transferred the page request to the paging service provider, the first LED emits green light continuously for a predetermined period of time and then turns off.

Those skilled in the art will recognize that other LEDs on the panel 140 can display additional information. For example, a second LED on the panel 140 can indicate, when lighted, that the page base 100 is in the process of automatically registering the page base 100 and the pager 102 for service.

A third LED on the panel 140 can indicate, when lighted, that a page request has been successfully transferred via the PSTN line 114 to the next element of the paging system. A fourth LED on the panel 140 can indicate when lighted that the user should pick up the handset of the telephone linked to the page base 100, for example to speak with a human operator who comes onto the line during paging service registration to obtain billing information directly from the user.

Where the pager 102 is capable of acknowledging receipt of the page signal via a radio frequency transmission (e.g., with SKYNET, a commercially available paging system), an LED on the panel 140 may so indicate. Other LEDs on the panel 140 may also indicate whether an intermediate element in the paging system has either successfully received the page signal, or has successfully transmitted the page signal onward. A paging service provider accessible via a PSTN phone line local to the page base 100 is an example of such an intermediate element, and will be discussed later in further detail. A functioning system according to this invention can be constructed with no other displays than these LEDs. Accordingly, in commercial production some systems will merely have LEDs, while other systems will have an LCD display panel as described below.

An alphanumeric display 130 having two lines, each 20 characters in length, may provide additional feedback to the user of the page base 100. The display 130 displays textual messages indicating the immediate status of the page base. For example, the display 130 can display the same information as the LED panel 140, only using textual messages. The display 130 can also display additional messages. For example, when dialing the paging service provider local access number yields a busy signal, the display 130 can display a message indicating that the line is busy and that the page base 100 will try again in several minutes. Those skilled in the art will recognize that the display 130 may easily be used to display a broad range of paging and registration status and user-prompt messages.

The control panel 120 includes a reset button. The reset button, when pressed, causes the page base 100 to re-register the dedicated paging system when the page button 21 is next pressed. Alternatively, the reset button may be situated in a protected location on the back of the page base 100, to prevent inadvertent re-registration.

Those skilled in the art will recognize that additional buttons can provide additional functions. For example, the control panel 120 may include a second button for aborting a page request before the page base 100 has finished transmitting page request information.

A third button on the control panel 120 can recall page information stored in the page base 100. This page information includes the identification number of the pager 102 associated with the page button 104, a paging service provider local access telephone number which the base 100 calls in order to transfer a page request, and a clearinghouse registration access telephone number.

Figure 3:
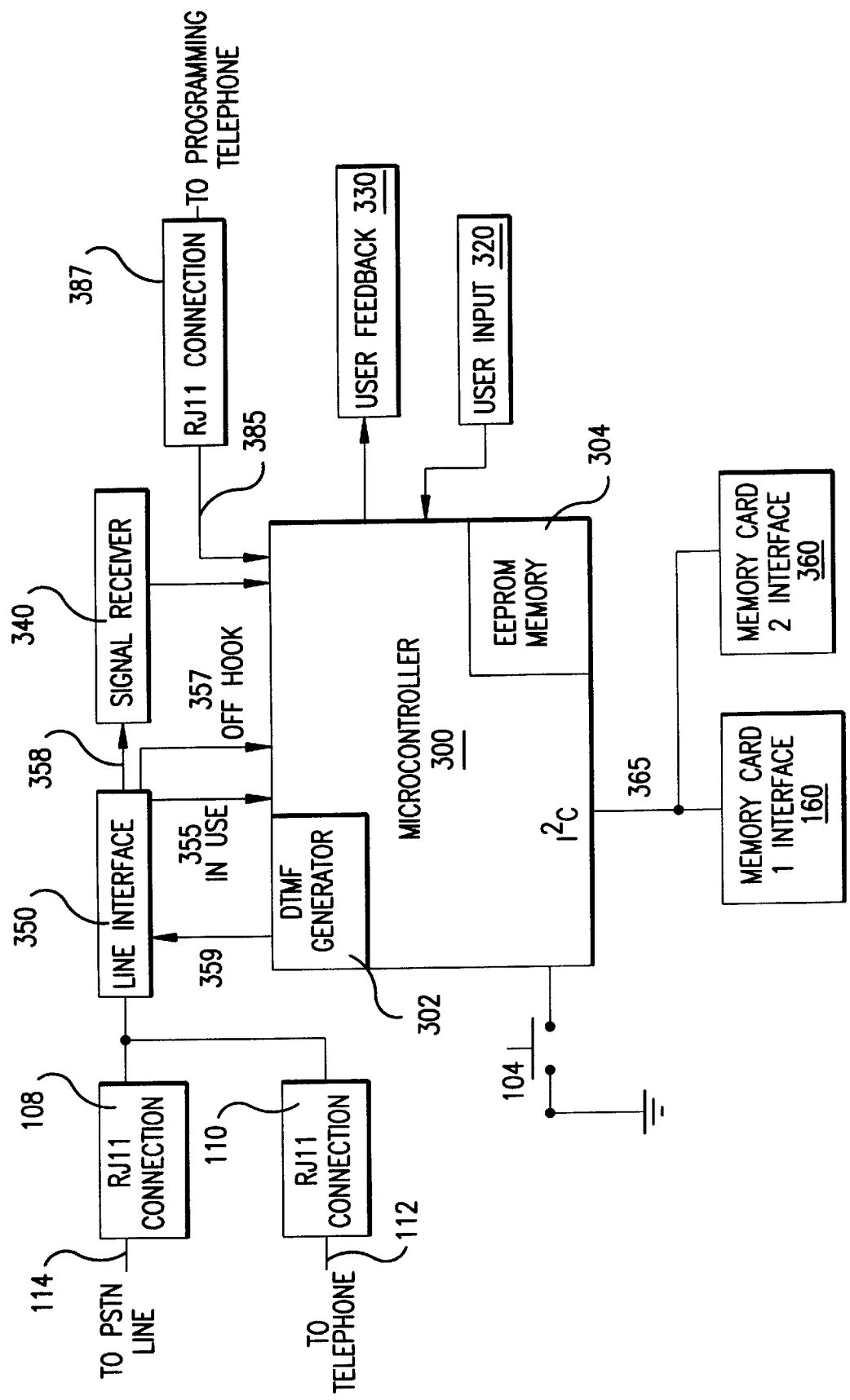
FIG. 3 is a block diagram illustrating internal components of the first preferred embodiment of the page base.

A fourth button on the control panel 120 can allow the user to change page information stored in the page base 100 by entering new information via the touch tone keypad of a telephone connected to the page base 100 via the line 112 and connection 110. For example, in the case where the page base 100 is connected within a private branch exchange (PBX) where a numeral such as "9" must first be dialed in order to obtain on outside phone line, the user could add the prefix "9" to the paging service provider local access number stored in the EEPROM memory 304, as shown in FIG. 3.

A button on the control panel can also be used to retrieve page history information to the LCD display panel 130, for example the date and time when the page button 104 was last pressed.

A speaker may also be included for additional user feedback. The speaker 150 can be used to generate a sound to verify that the page button has been pressed. The speaker 150 may also generate sounds corresponding to the light emissions of the first LED in the LED display 140 described above, e.g. continuous or pulsing sounds having different tones. This has the advantage of allowing this device to simplify paging for the blind. Alternatively, the page base 100 may be equipped with a digital voice synthesizer. The digital voice synthesizer would enable the speaker 150 to transmit voice messages to the user that correspond to the text messages described above with respect to the LCD display 130.

A memory card 162 contains information which the page base 100 uses to register the page system with the page service provider. Specifically, information stored on the card 162 includes the identification number of the pager to be registered, the phone number of a clearinghouse which the page base 100 may call to register the page system, and information indicating whether the page service between the page base 100 and the pager 102 will be local or national in geographic scope.

When the card 162 is inserted into the card slot 160 in the page base 100, the page base 100 may electronically access the information contained on the card 162.

Alternatively, some or all of the information contained on the card 162 may be loaded into a memory unit within the page base 100 at the factory, or may be loaded into the memory unit of the page base 100 by the user. The user can load the information by pressing a control button on the control panel 120 to begin a data entry sequence. Thereafter, the information is entered by pressing keys on a touch tone keypad of a telephone connected to the page base 100 via the connector 110 and line 112, in response to textual prompts shown on the LCD display 130. In addition, the LCD display 130 mirrors the data entry to allow visual verification of the entered data.

Figure 2:
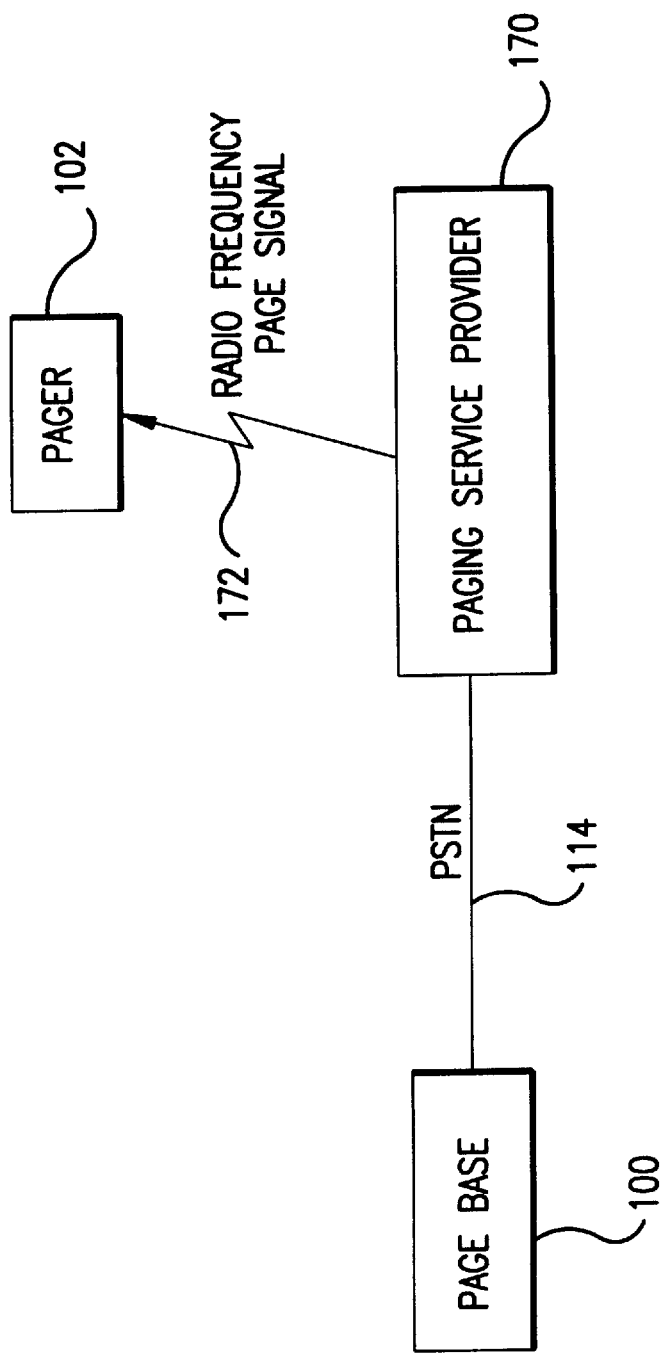
FIG. 2 is an overall block diagram of a paging system according to this invention.

As shown in FIG. 2, when the page button 104 is pressed, the page base 100 automatically dials a phone number to contact a paging service provider 170 and provide information to the paging service provider 170 necessary to execute the page. The paging service provider 170 then uses the information received from the page base 100 to send a radio frequency page signal 172 to the pager 102.

FIG. 3 shows components of the page base 100 in block diagram form. The microcontroller 300 controls activities of the page base 100 during paging service registration and during transfer of a page request to the paging service provider. In addition to accepting information input to the page base 100 by the user and displaying information as described above, the microcontroller 300 also sends and receives information to the registration clearinghouse and the paging service provider via the PSTN line 114. The information is transferred using coded sequences of dual tone multi-frequency (DTMF) tones. Those skilled in the art will recognize that other well known information transfer protocols for use with PSTN lines may also be used to implement communication between the page base 100 and the registration clearinghouse and paging service provider.

The preferred microcontroller 300 contains within it a dual tone multi-frequency (DTMF) generator 302 for generating touch tones for transmission to the PSTN line 114 via the connecting line 359 and the interface 350. As those skilled in the art will recognize, where a microcontroller is used which does not contain a DTMF generator, a separate DTMF generator may be included in the circuit. Signals input from the line interface 350 over the line 355 indicate to the microcontroller 300 when the PSTN line is 114 is in use, for example by a person conducting a voice conversation on the line 114 of an extension telephone connected to the page base 100 or any other telephone connected to the same line 114. For example, if the page base 100 is installed in the living room of a home, it would detect the use of an extension phone installed in the bedroom. Signals input from the line interface 350 over the line 357 indicate to the microcontroller 300 when the line 114 is on hook.

The signal receiver 340 is preferably a DTMF receiver that receives and decodes touch tones transmitted through the line interface 350, and/or a zero-crossing detector for detecting information conveyed via monotone sound signals of different frequency and/or time duration.

The user feedback circuit 330 includes the speaker 150, the LED display 140, and the LCD display 130 described above. The user input circuit 320 includes the control panel 120 and page button 104 as described above.

The electrically erasable programmable read-only memory (EEPROM) 304 within the microcontroller 300 stores data obtained from the memory card 162 as described above. The EEPROM 304 also stores information received during the manufacturing process, during the page system registration process, and/or from the user. This information includes the paging service provider local access number and any additional data or protocol information required to transmit a page request to the paging service provider. When caller ID is not available, this additional protocol information may include the phone number of the telephone line the page base 100 will be calling out on. As shown, the microcontroller 300 may be connected to more than one memory card 162 via the interfaces 160 and 360 via an I²C (Trademark) line 365 as used by major smart card manufacturers. As will be apparent to those skilled in the art, alternate interfaces can be used depending on the type of smart card used, including PCMIA, direct addressing, etc. When all of the information is stored in the smart card and when the card does not have to be removed, the EEPROM may be eliminated to save cost. This embodiment can be used, for example, in a single pager system.

The line 385 connects to a touch tone telephone via an RJ11 connection 387. The user can use the connected touch tone telephone to enter information into the page base 100.

Figure 4:
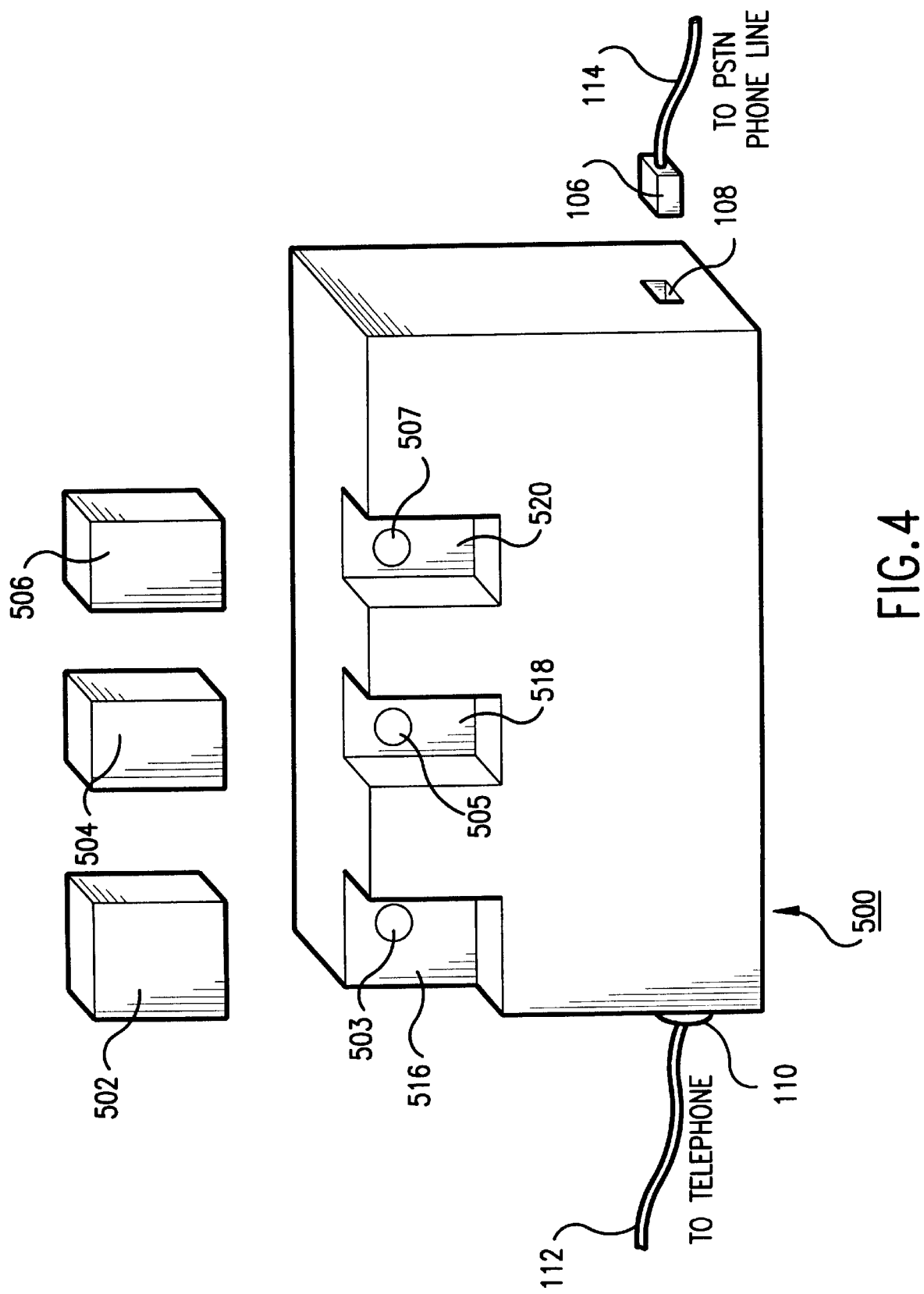
FIG. 4 shows a second embodiment of the page base according to this invention.

FIG. 4 shows the page base according to a second preferred embodiment of the invention. The page base 500 has a plurality of pagers, 502, 504 and 506. Each pager 502, 504 and 506 has a corresponding pocket 516, 518 and 520, and a corresponding dedicated page button 503, 505 and 507. When one of the page buttons 503, 505 or 507 is pressed, the page base 500 automatically contacts a paging service provider via the PSTN line 114, and as part of the page request, transmits to the paging service provider a pager identification for the pager corresponding to the pressed page button.

Those skilled in the art will recognize that the control panel 120, LCD display 130, LED display 140, and speaker 150, as described above with respect to the first preferred embodiment, can also be used collectively or individually in the second embodiment.

In addition, the pagers and the pager buttons can be associated in various ways. In one configuration, the pagers and pager buttons are color coded so that users may easily discern which pager button will activate a particular pager. Text labels may be used instead of, or in addition to, color labels. In another configuration, the pockets 516, 518 and 520 and the associated pagers 502, 504 and 506 are shaped so that each pager will fit only into the pocket associated with it.

If the page base 500 is connected only to one phone line, then when one of the page buttons is pressed, the paging service provider must answer the call from the page base in order to receive information identifying which pager is to be paged. Alternatively, the pagers can be identified to the paging service provider by a combination of the caller ID of the page base and the local access number called by the page base in order to place the page request. In other words, the page base dials a different local access number for each page button.

Figure 5:
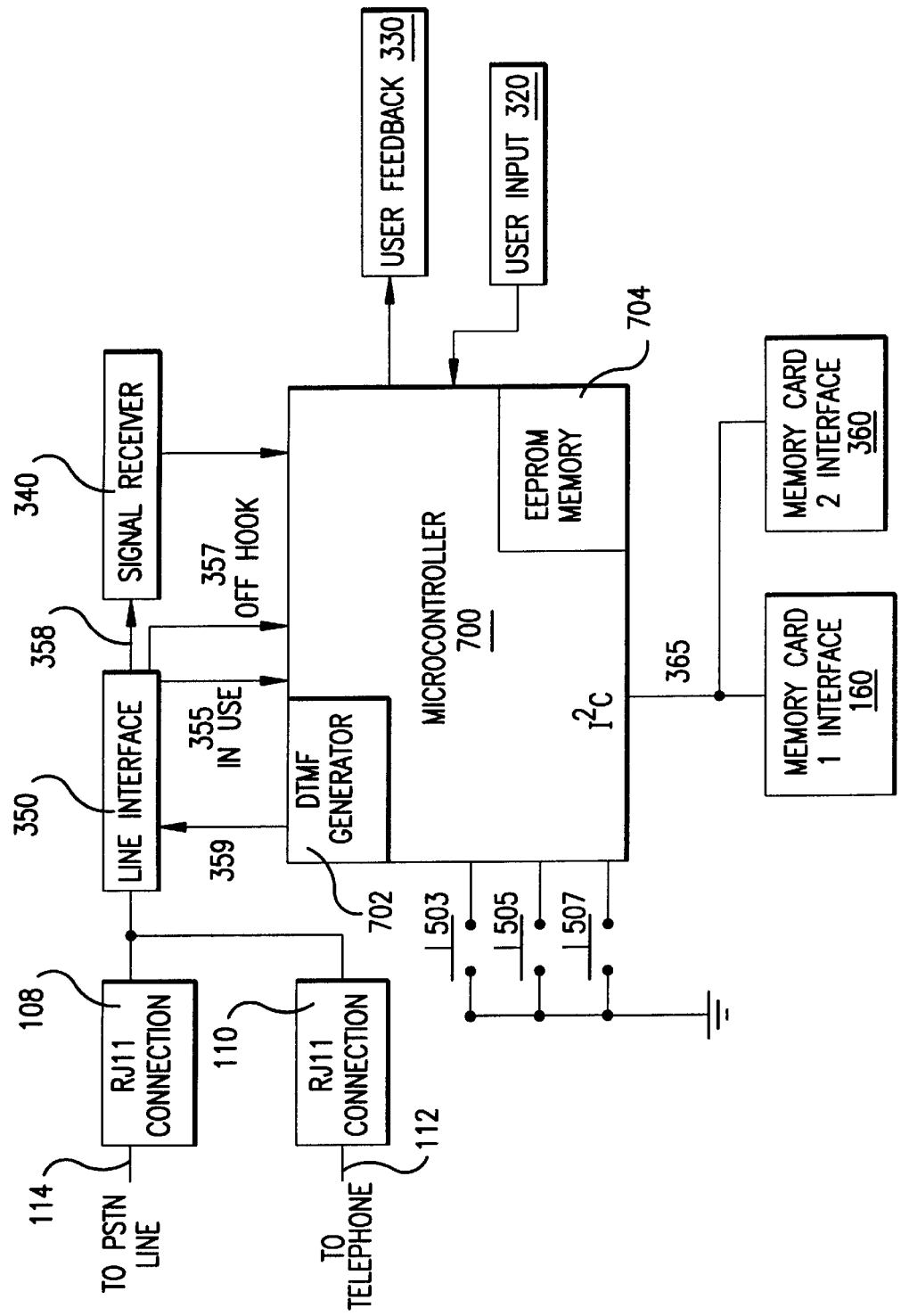
FIG. 5 is a block diagram of internal components of the page base of FIG. 4.

FIG. 5 shows components of the page base 500 in block diagram form. The page base 500 includes the page buttons 503, 505 and 507. FIG. 5 is otherwise similar to FIG. 3.

Figure 6:
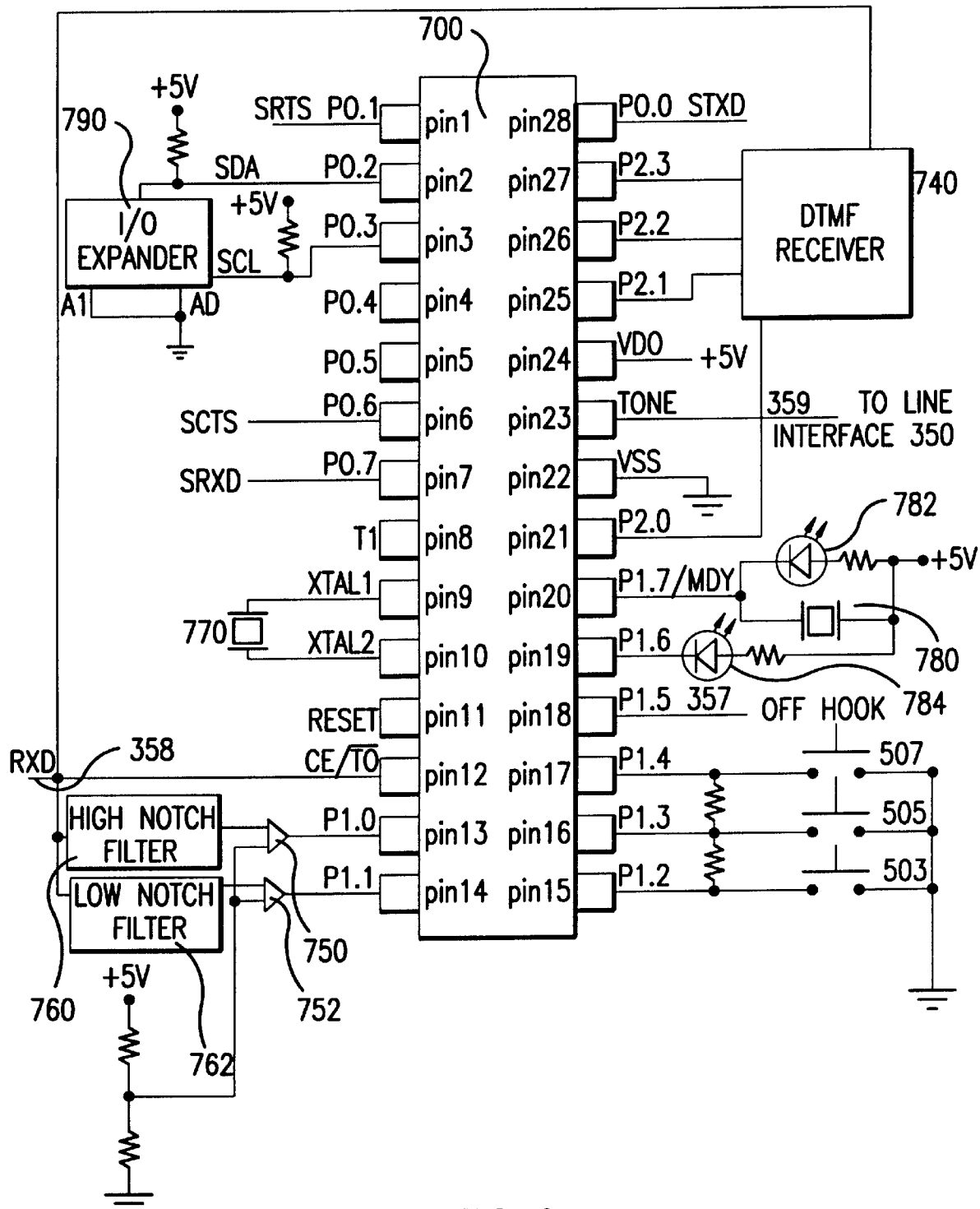
FIG. 6 is a schematic diagram showing internal circuitry of some of the components of FIG. 4.

The microcontroller 700 of FIG. 5 is shown in greater detail in FIG. 6. Pins 1–3, 6–7, and 28 together form the line 365. Specifically, pin 1 carries a serial ready to send (SRTS) signal. Pin 2 carries a serial data (SDA) signal. Pin 3 carries a serial clock (SCL) signal. Pin 6 carries a serial clear to send (SCTS) signal. Pin 7 carries a serial receive data (SRXD) signal, and pin 28 carries a Serial Transmit Data (STXD) signal. Pins 1–3, 6–7 and 28 allow transmission of data according to various communications protocols. For example, pins 2 and 3 together with an I/O Expander 790 allow data transmission according to the I²C (Trademark) protocol.

A crystal 770 is connected to pins 9 and 10. Pins 13 and 14 are respectively connected to comparators 750 and 752, which are in turn connected to the high notch filter 760 and the low notch filter 762. The comparators 750 and 752, filters 760 and 762, and their respective connections together form a zero crossing detector circuit that can detect the presence of signals at two frequencies. The two frequencies correspond to frequencies passed by the notch filters 760 and 762, respectively. The zero crossing detector circuit thus enables use of a frequency shift key (FSK) communication protocol.

A DTMF detector 740 is also shown connected to the microcontroller 700. The receive data (RXD) signal is carried by the connecting line 358 from the line interface 350 to the DTMF receiver 740 and the zero crossing detector circuit described above.

The output of pin 23 is a DTMF tone output linked by the connecting line 359 to the line interface 350. Pins 19–20 are connected to an LED 784 and LED 782, and a buzzer/speaker 780, respectively, as the user feedback device described above with respect to the first preferred embodiment. Pin 18 of the microcontroller 700 receives an off hook signal from the line interface 350 via the off hook signal line 357.

Figure 7:
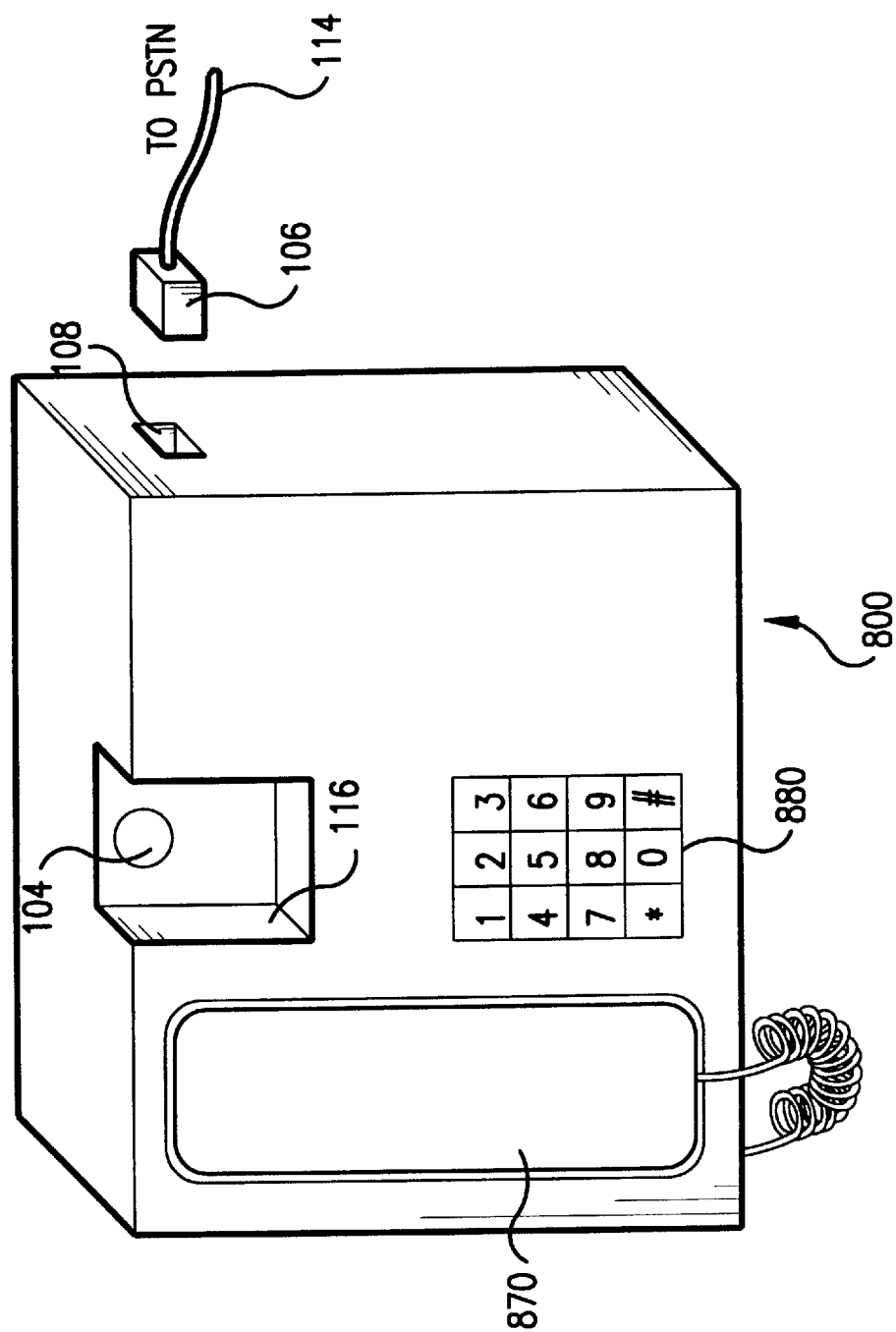
FIG. 7 shows a third embodiment of the page base according to this invention.

FIG. 7 shows a third preferred embodiment of a page base according to this invention, wherein a page base and a telephone are combined into a single unit 800. The combined unit 800 has a telephone handset 870 and a touch tone keypad 880, and may include features of the page base 100 described above. In addition to having the additional functions of a telephone and pager operation in the same fashion as described above, the combined unit 800 can allow direct user configuration and set up via the integral keyboard.

Figure 8:
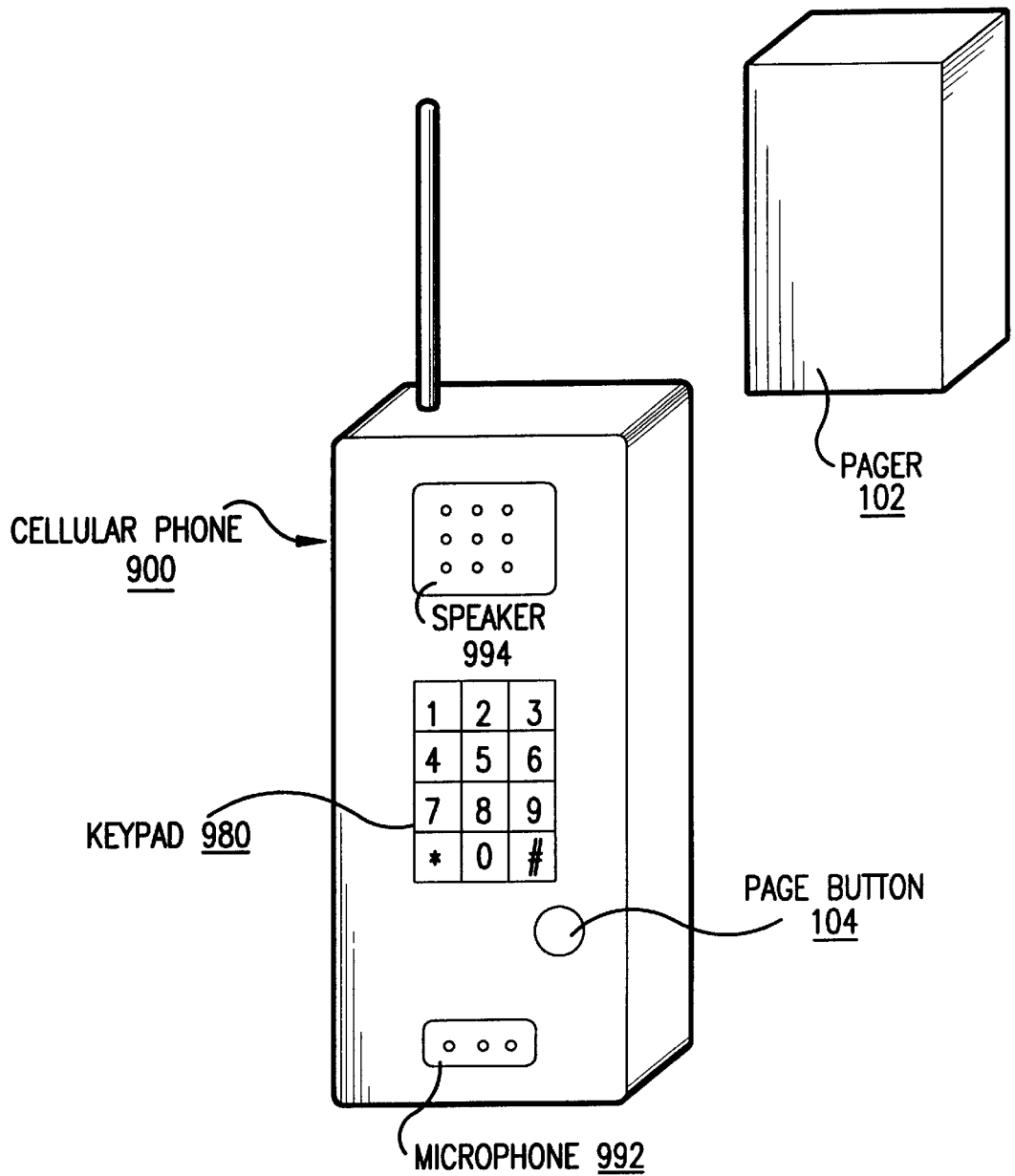
FIG. 8 shows a variation of the third embodiment of the page base.

FIG. 8 shows a variation of the third embodiment of the page base, wherein a mobile or cellular telephone is combined with a page base to form a mobile, combined unit 900. Pressing the page button 104 causes the combined unit 900 to initiate a page to the pager 102. The combined unit 900 includes well known features of mobile and cellular phones currently in commercial use, including a microphone 992, a speaker 994, and a touchtone keypad 980. Those skilled in the art will realize that the combined unit 900 may include any of the well known features of mobile and cellular telephones. In addition, the combined unit 900 may include any of the specific features described above with respect to the first preferred embodiment of the page base 100. Paging functions of the combined unit 900 are similar to paging functions of the page base 100 and the page base 800, as described above.

Figure 9:
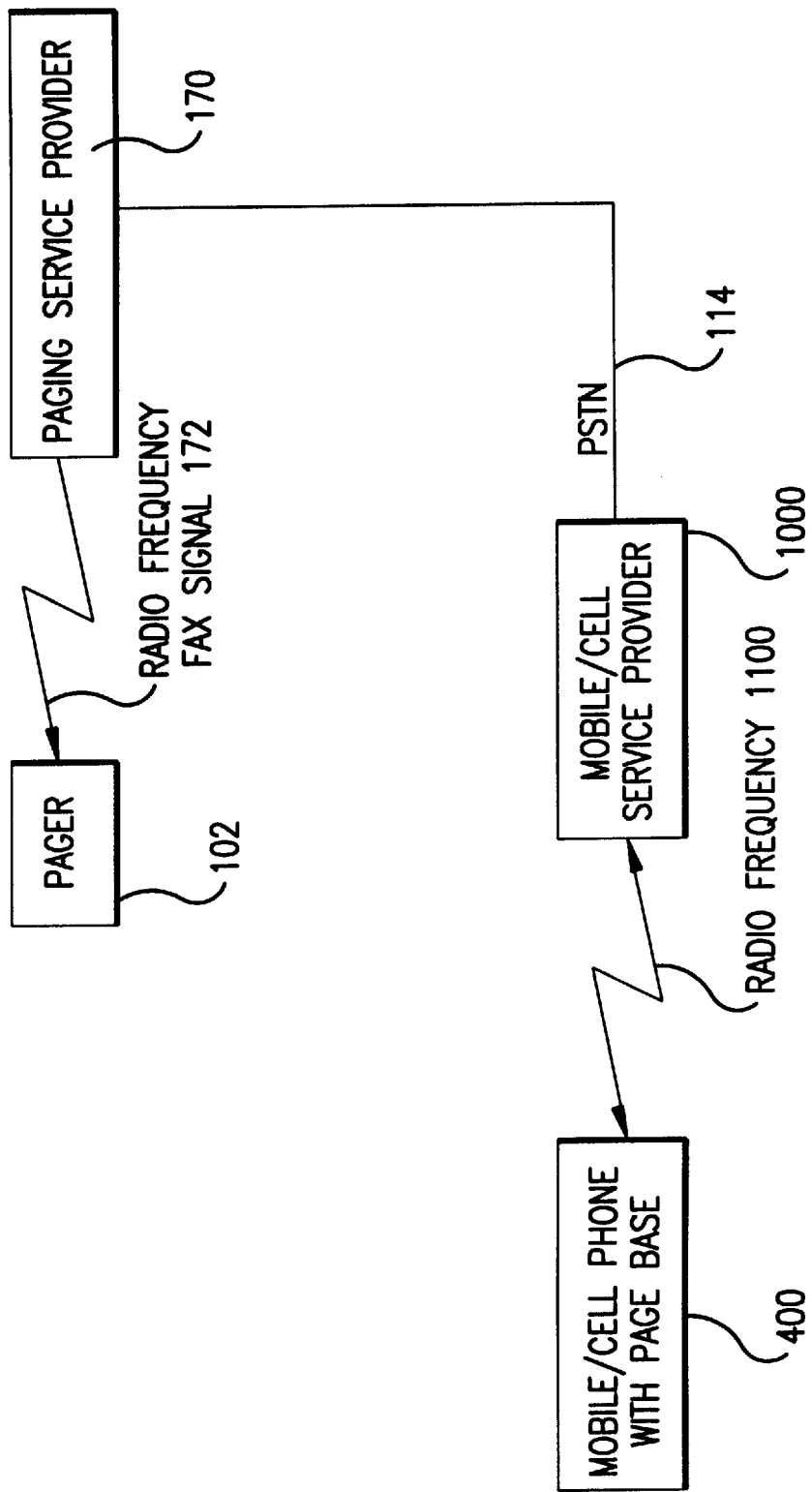
FIG. 9 shows the page base of FIG. 8 within an overall view of the paging system according to the invention.

FIG. 9 shows the combined page base and mobile telephone unit 900 in a paging system according to the invention. When the page button 104 (shown in FIG. 8) is pressed, the combined unit 900 sends paging information via a radio frequency transmission 1100 to a mobile/cell service provider 1000. The mobile/cell service provider 1000 passes the information to the paging service provider 170 via the PSTN line 114. The paging service provider 170 then pages the pager 102 via the radio frequency page signal 172. The only substantial difference between the paging system shown in FIG. 2 and the paging system shown in FIG. 9 is the additional link of the radio frequency transmission 1100 and the mobile/cell service provider 1000 between the page base 900 and the PSTN line 114, as shown in FIG. 9.

In the illustrated embodiments, the microcontroller may be implemented as a single special purpose integrated circuit (e.g., ASIC) having a main or central processor section for overall, system-level control, and separate sections dedicated to performing various different specific computations, functions and other processes under control of the central processor section. Those skilled in the art will appreciate that the controller can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The microcontroller can also be implemented using a suitably programmed general purpose computer, e.g., a microprocessor, other processor device (CPU or MPU), either alone or in conjunction with one or more peripheral (e.g., integrated circuit) data and signal processing devices. In general, any device or assembly of devices containing a finite state machine capable of implementing and coordinating the functions described in this disclosure can be used as the controller.

Figure 10:
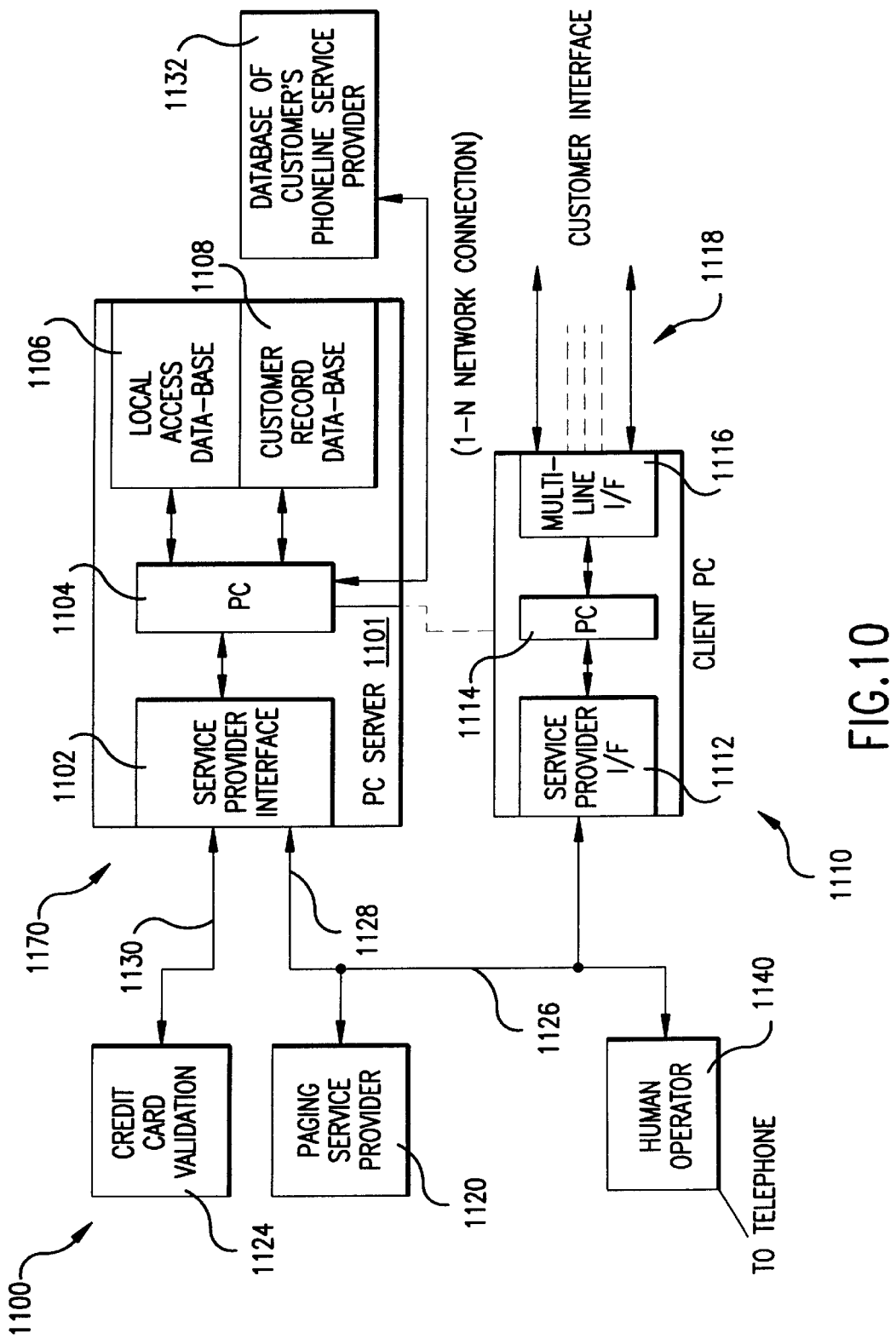
FIG. 10 is a block diagram showing a service provider together with an interface system between the service provider and users of the paging system according to this invention.

FIG. 10 is a block diagram of a paging system 1100 having a paging service provider 1120 together with an interface system 1170 between the paging service provider 1120 and users of the paging system. The interface system 1170 and the paging service provider 1120 together process both registration and page request calls.

The personal computer (PC) server 1101 contains a personal computer 1104, and a local access database 1106 that stores paging service information. For each registered page base 100, the paging service information includes the caller ID of the page base 100, the pager identification(s) of the pager 102 or pagers 502, 504 and 506 dedicated to the page base 100, any predetermined message or messages that the service provider would send to the pager upon receipt of a page request from the page base 100, and the proper local access number for the user.

The PC server 1101 also contains a customer record database 1108. Information stored in the customer record database 1108 includes, for each registered page base 100, the billing information associated with the user of the page base 100. The customer record database 1108 also stores information tracking the use of the dedicated pager system.

In addition, the PC server 1100 has access to the line service provider database 1132, which is maintained by the service provider of the PSTN phone line on which the customer's page base 100 calls out. The line service provider database 1132 contains original billing information relating to the customer's phone line.

Where the paging service provider and line service provider maintain separate databases, as described above, information can initially be copied from the line service database to the paging service provider database. Thereafter, the paging service provider and the line service provider may generate separate billing statements to the user/owner of the dedicated pager and the phone line. Alternatively, the line service provider database could be used exclusively to generate billing for both the line service and the paging service, for example in a single monthly statement.

The service provider interface 1102 connects the PC server 1101 to both a credit card validation unit 1124 via a line 1130 and a paging service provider 1120 via a line 1128.

The PC client system 1110 is connected to the PC server 1100 via the client PC service provider interface 1112. The PC client system 1110 contains a second personal computer 1114, which connects to the multi-line interface 1116. The multi-line interface 1116 handles a multiplicity of phone lines 1118, over which the customer page bases 100 communicate with the client PC 1114. These interface cards can be purchased from companies such as Dialogic and Rhetorex and are common in the telephone industry.

In the preferred embodiment, the PC client system 1110 and the PC server 1100 distinguish between page request calls and registration calls by discerning which telephone number a page base 100 has used to contact the interface system 1170. In other words, calls to the interface system 1170 received via a first set of telephone numbers are treated as registration request calls, and calls received via a second set of telephone numbers are treated as page request calls. Some of the telephone lines 1118 are associated with the first set of telephone numbers, and others of the telephone lines 1118 are associated with the second set of telephone numbers. Ideally, the first set of telephone numbers contains at least one number which is a toll-free number. In an alternate embodiment, the page base can transmit an ID character or tone indicating what kind of call the page base is making, (page request as opposed to registration request, for example) in order to give direction to the PC client.

As introduced above in the detailed description of FIG. 4, the second set of telephone numbers can be organized into categories so that telephone numbers within a first category are used to place page requests for first pagers associated with a caller ID, telephone numbers within a second category are used to place page requests for second pagers associated with the caller ID, and so forth. The paging service provider would look up the appropriate pager ID number using the caller ID and the category of the called phone number.

As commercial demands upon the interface system 1170 increase, additional client PC's 1110 can be connected to the PC server 1100 to handle increased paging registration and paging request traffic. The description given of the service provider interface is exemplary only. The functions that are listed may be broken down into more function units, or may be aggregated into fewer, more powerful computer systems, depending on the choices of the individual paging service providers.

A human operator 1140 is also part of the paging service provider system, and is shown with communication links to the client PC 1110 and the PC server 1100. The human operator communicates with the customer as required during processing of both paging service registration and paging requests.

Figure 11:
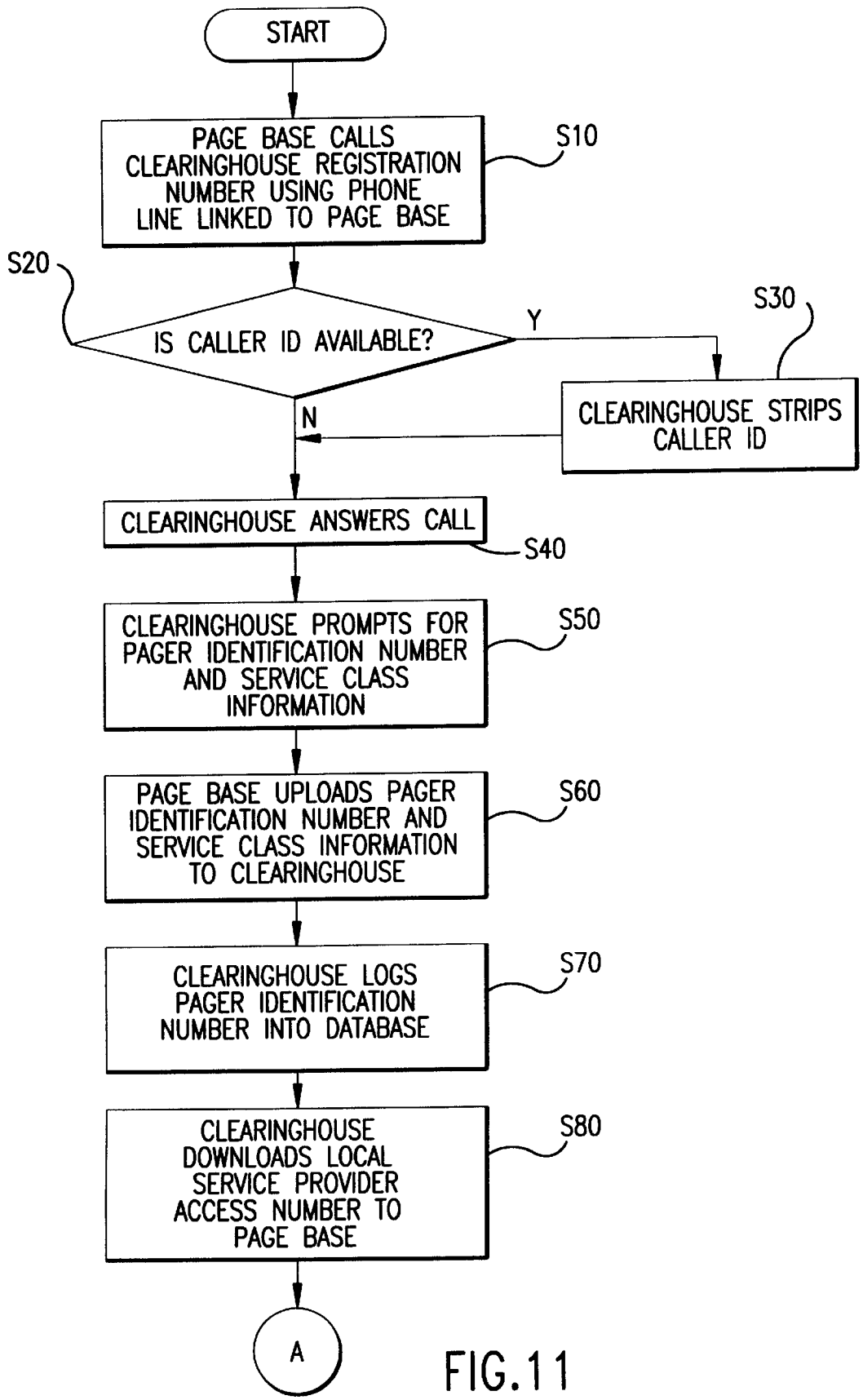
FIGS. 11–12 are a flowchart showing a method for automatically registering a dedicated pager system.
Figure 12:
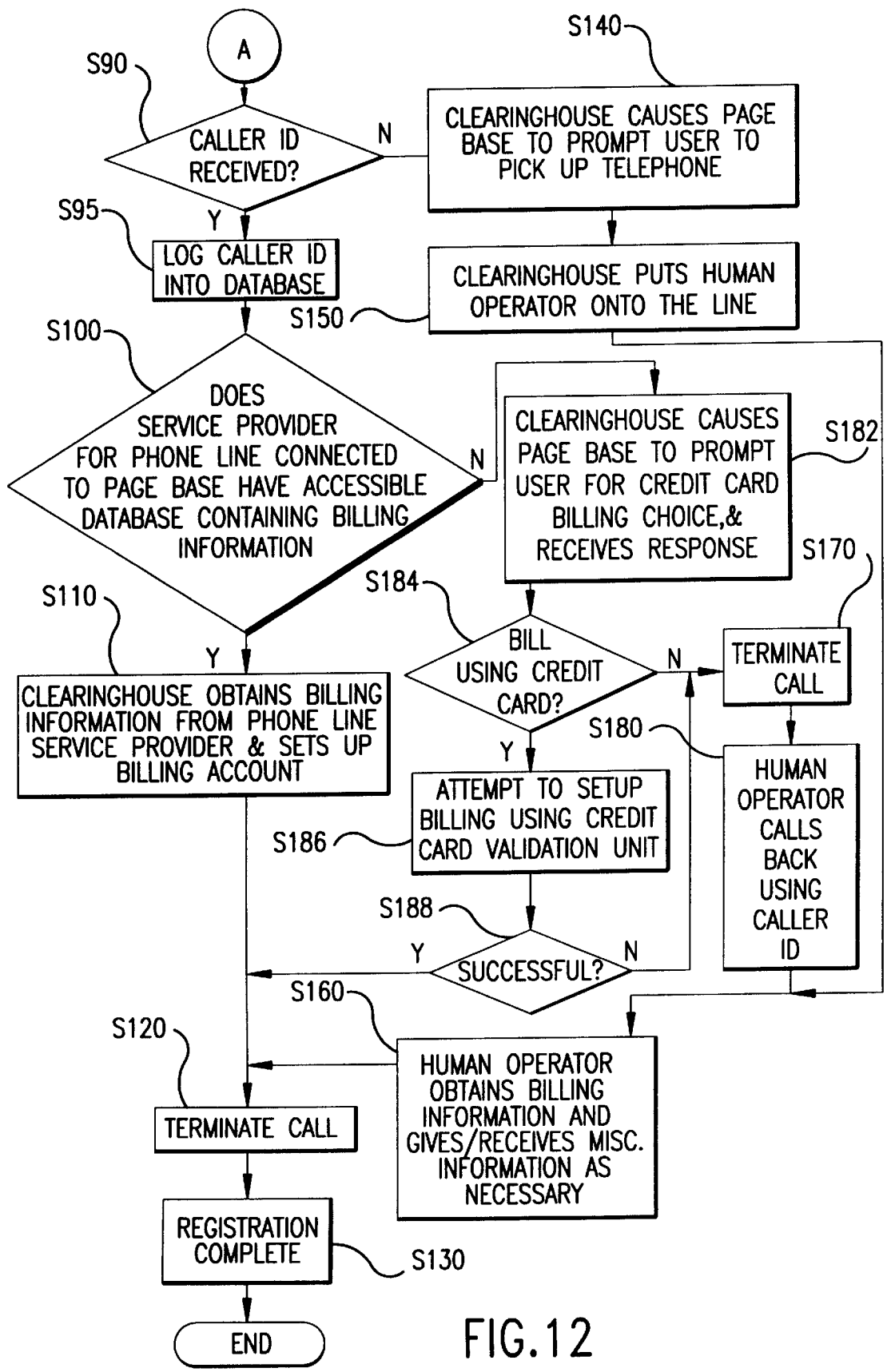

FIGS. 11–12 outline an automatic registration procedure using the page base 100 and the interface system 1170 together with the paging service provider 1120.

As shown in FIG. 11, in step S10, when the page base 100 has not yet been registered, pressing the page button 104 causes the page base 100 to automatically call a clearinghouse telephone number. The clearinghouse telephone number is stored in the EEPROM memory 304. The page base 100 calls out using the PSTN phone line 114 linked to the page base 100. The clearinghouse telephone number is among the first set of telephone numbers described above. Thus, the interface system 1170 treats the call as a registration request.

Next, in step S20, the clearinghouse determines if the caller ID information is available. If so, control continues to step S30. In step S30, because the caller ID is available, the interface system 1170 strips the caller ID of the incoming call from the page base 100. Otherwise control moves directly to step S40.

In step S40, the clearinghouse answers the call. In step S50, the interface system 1170 prompts the page base 100 for the identification information of the dedicated pager 102 and for service class information, both of which are stored in the EEPROM memory 304 of the page base 100.

In response, in step S60, the page base 100 uploads the pager identification information and any applicable service class options (for example, local vs. regionwide vs. nationwide paging).

In step S70, the interface system 1170 logs both the caller ID and the pager identification number for storage into the service provider's local access database 1106.

In step S80, the clearinghouse downloads a local access telephone number which the page base 100 uses to transmit a page request. The local access telephone number allows the page base 100 to connect with the client PC 1110 via one of the second set of telephone lines 1118. In the preferred embodiment, the first set of phone lines 1118 are 800 numbers for use in registration, and the second set of phone lines are local phone call access numbers for use in placing a page request with the paging service provider. The local access numbers do not incur toll charges.

In step S90, the interface system 1170 determines whether a caller ID was obtained. If the caller ID was obtained, control continues to step S95. Otherwise, control jumps to step S140. In step S95, the caller ID is logged into the paging service provider database. In step S100, the clearinghouse determines if it has access to the billing information database of the phone service provider to which the calling phone number line belongs. If the billing information is available, control continues to step S110.

In step S110, the interface system 1170 obtains billing information from the customer's phone line service provider via the database 1132, and uses the information to set up a billing account. Control then proceeds to step S120, where the call is terminated, and culminates in step S130 where the registration process is complete.

If, in step S100, the clearinghouse determines that the billing information is not available, control jumps to step S182. In step S182, the clearinghouse causes the page base to prompt the user to enter either a credit card number or a response declining credit card billing, and receives the user's response (via touch tone, for example, or via voice recognition). Control then jumps to step S184, where the user's response is evaluated. If the user entered a credit card number, then control proceeds to step S186 wherein a credit card validation unit attempts to verify the credit card and set up the billing. If the validation unit is successful, then control proceeds to step S120 where the call is terminated, and registration is completed. If the attempt to verify the credit card and set up billing was not successful, the control proceeds from step S184 to step S170.

In step S170, the clearinghouse terminates the call and proceeds to step S180. In step S180, a human operator uses the caller ID to call the user. Control then proceeds to step 160, wherein the human operator obtains billing information from the customer and gives and/or receives other information as necessary. Thereafter, control proceeds first to step S120 where the call is terminated, and the registration process ends.

If at step S90 it is determined that a caller ID has not been received, then in step 140 the clearinghouse sends a signal to the page base 100. The signal causes the page base 100 to prompt the user to pick up the telephone so that the user can speak directly to an operator. Control then jumps to step S150.

In step S150, the interface system 1170 puts the human operator 1140 onto the line. In step S160, the human operator obtains billing information from the customer and gives or receives other information as necessary. Control then continues to step S120 where the call is terminated. The registration process then ends.

When a paging service provider has access to a billing database, e.g. if the paging service provider is also a telephone line service provider, the whole process can be completely automated. When fully automatic or manually aided automatic registration is not possible, there is an alternate registration process which is manually initiated.

Figure 13:
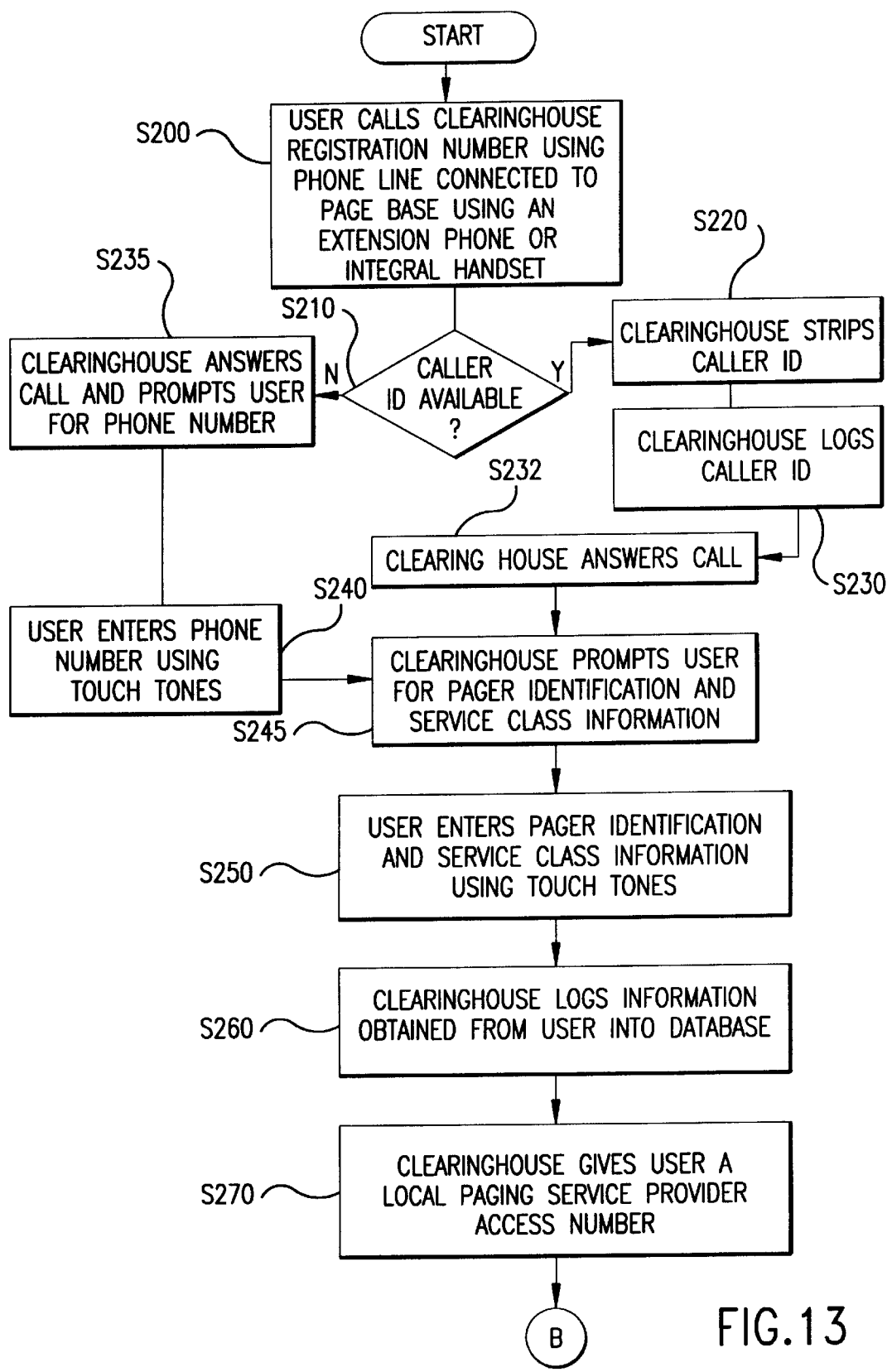
FIGS. 13–14 are a flowchart outlining a method for manually registering a dedicated pager system.
Figure 14:
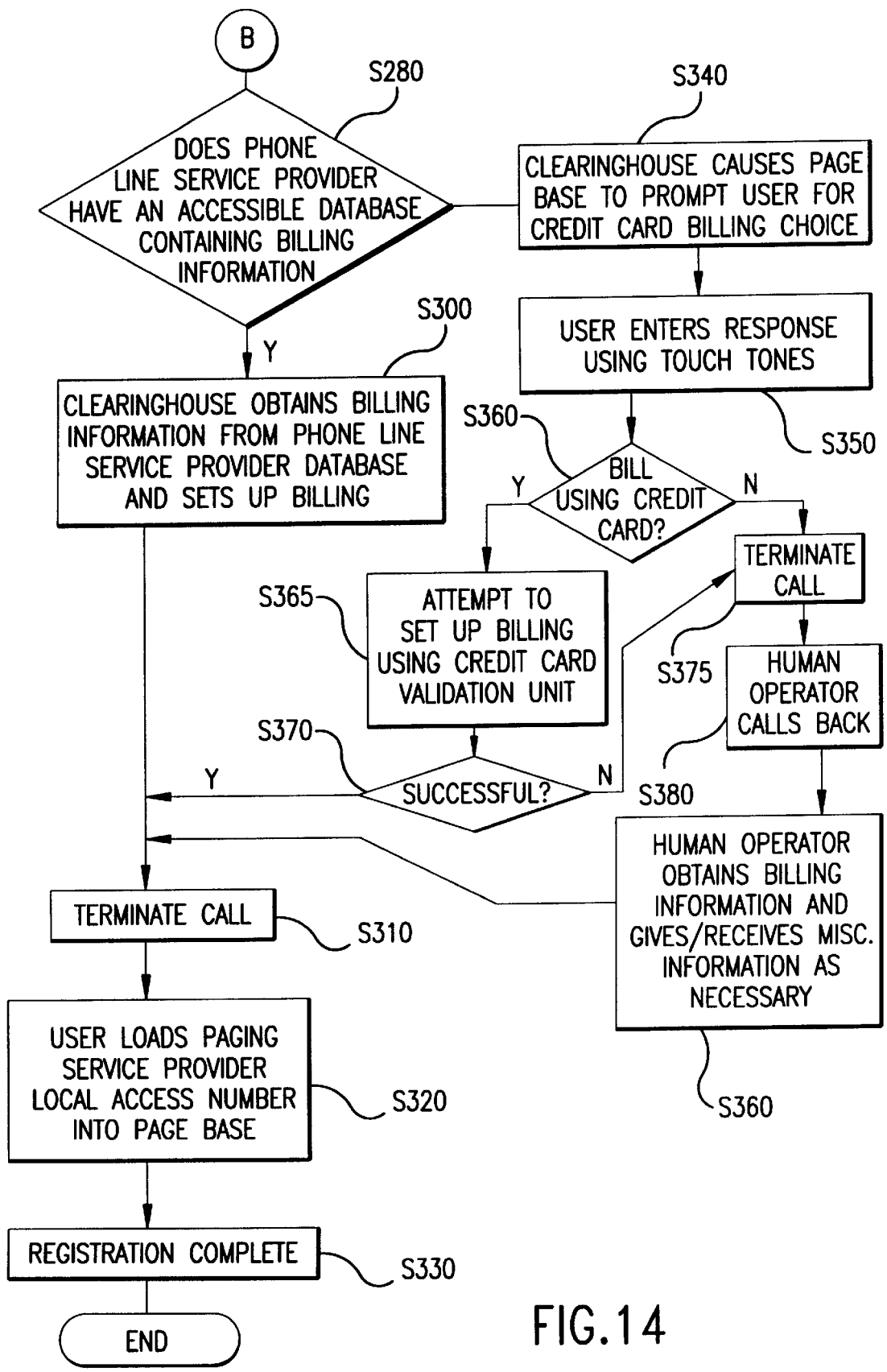

FIGS. 13–14 outline this manual registration sequence involving the paging service provider 1120 and the interface system 1170.

In step 200, the customer dials the clearinghouse registration number using the same phone line to which the page base is connected.

In step 210, the interface system 1170 determines whether caller ID is available. If caller ID is available, then in step S220 the interface system 1170 strips the caller ID. In step S230, the clearinghouse logs the caller ID, and proceeds to step S232. If in step S210 the interface system 1170 determines that caller ID is not available, then control proceeds to step S235.

In step S235, the interface system 1170 answers the call and prompts the customer for the phone number of the phone line connected to the page base. Control then jumps to step S240, where the user enters the phone number using touch tones. Thereafter, control proceeds to step S245. In step S245, the clearinghouse answers the call and prompts the user for the pager ID number and service class information. This and the following prompts can be given by a human operator in a fully manual system or by using a DTMF-based interactive voice response system common within the call processing industry. The user is provided with the pager ID number in printed materials shipped with the pager.

In step S250, the customer enters the pager identification and service class information using touch tones. In step S260, the interface system 1170 logs the service class information and the pager identification for storage into the customer record database 1108 and the local access database 1106, and also logs the caller ID if the caller ID was entered by the user using touch tones in step S240.

In step S270, the interface system gives the customer a local paging service provider access number. When the unit 100 includes a keypad, the customer can enter this number into the page base 100 during the call, or after the call concludes.

In step S280, the system determines whether the phone line service provider has an accessible database containing billing information. If so, control proceeds to step S300, where the clearinghouse obtains billing information from the database and sets up a billing account. Control then jumps to step S310, where the call is terminated. In step S320, the user loads the paging service provider local access number received in step S270 into the page base, and registration is complete.

If in step S280 the system determines that the phone line service provider database is not accessible, control proceeds to step S340. In step S340, the clearinghouse causes the page base to prompt the user to choose whether to set up billing using a credit card. In step S350, the clearinghouse receives the response from the user, which if affirmative, includes a credit card number. In step S360, the system determines whether the user has selected credit card billing. If so, then control proceeds to step S365 where the clearinghouse attempts to verify the credit card and set up the billing. If the attempt is successful, control then proceeds to step S310, wherein the call is terminated. In step S320, the user loads the paging service provider local access number into the page base, and registration is complete.

If in step S370 the attempt to verify the credit card and set up the billing is unsuccessful, control jumps to step S375. In step S375, the call is terminated. In step S380, a human operator calls back. In step S360, the human operator obtains billing information and gives and/or receives other information as necessary. Control then proceeds to step S310, wherein the call is terminated. In step S320, the user loads the local access number into the page base, and registration is complete.

If in step S360 the user decides not to use a credit card for the billing, control proceeds to step S375 where the call is terminated. Control then proceeds to step S380 where a human operator calls back. The sequence then continues as described above with respect to step S360 and steps S310–330.

The registration sequences shown in FIGS. 11–12 and 13–14, can be easily modified to accommodate desirable variations. Access to the human operator 1140 is not limited only to the instances shown, but can be given at any appropriate point in the registration sequences. Where caller ID is available, a human operator can also use the caller ID to contact the user after a call has been terminated for final confirmation. Transfer of information to the paging service provider via user-entered touch tones is not limited only to the instances outlined above, but can occur at any appropriate point in the registration sequences, as those skilled in the art will recognize. In addition, where the paging service provider has voice recognition capability, the user can transfer information orally without speaking to a human operator. This would be particularly useful where the user's phone does not have touch tone capability.

Furthermore, gathering and processing of billing information during registration could be omitted completely where the paging service local access number is a special toll number, for example a "1-900" number. Those skilled in the art will also recognize that elements from each of the automated registration sequence and the manual registration sequence described above can be variously combined to form registration sequences that are both manual and automatic, according to the needs and limitations of the user and the paging service provider. For example, when manual registration process steps are used but the user cannot enter information directly into the page base, registration is not complete when the registration call is terminated. When the page button is next pressed, the page base again calls the clearinghouse. The clearinghouse recognizes that registration is partially complete, and downloads the local access number directly to the page base, thus completing the registration. Thereafter, pressing the page button causes the page base to call the local access number to place a page request.

As the telecommunication industry continues to develop and use new technology, additional variations of the invention will become possible. For example, if personal credit card information were stored within a personal smart card, and if the page base memory card interface were constructed to be smart card-compatible, then at the point in the registration sequence where the clearinghouse prompts for a credit card number to set up billing, the user could simply insert the smart card into the page base to allow the clearinghouse to automatically access the credit card information on the smart card.

Figure 15:
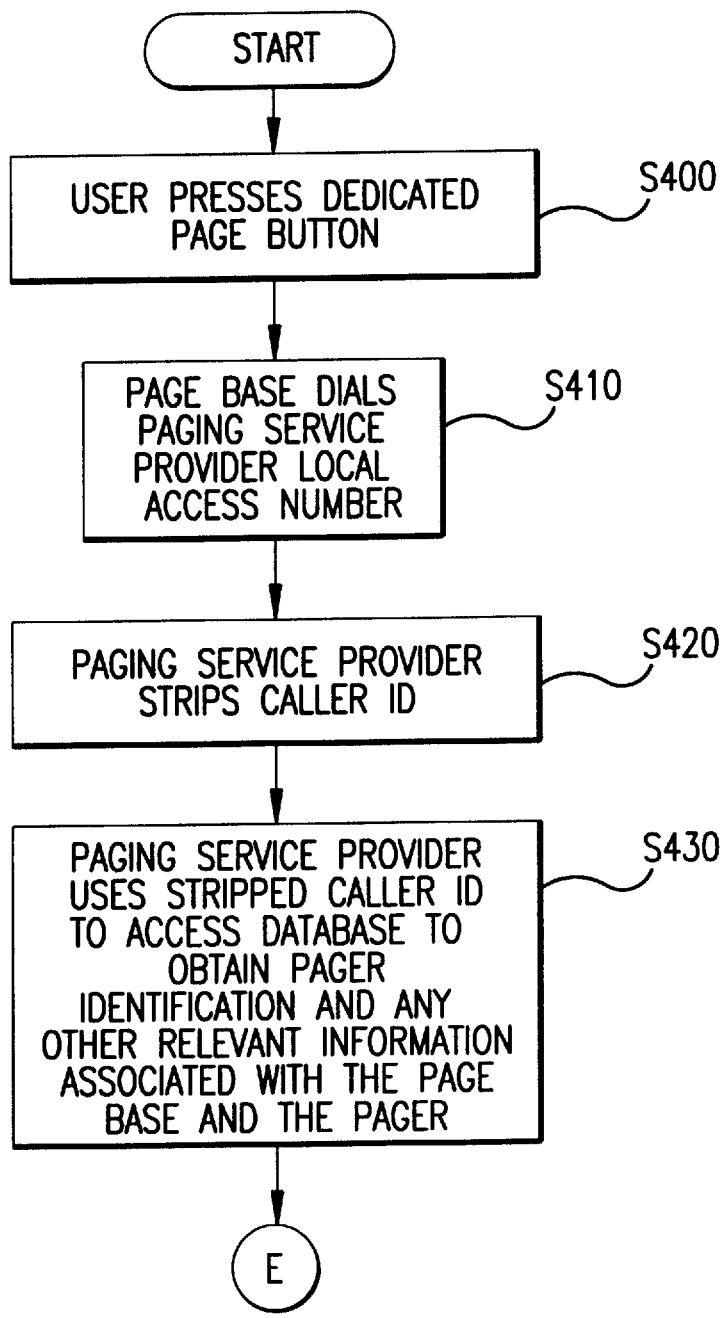
FIGS. 15–16 are a flowchart outlining a method for requesting pages for dedicated pager systems registered according to either the method shown in FIGS. 11–12 or shown in FIGS. 13–14.
Figure 16:
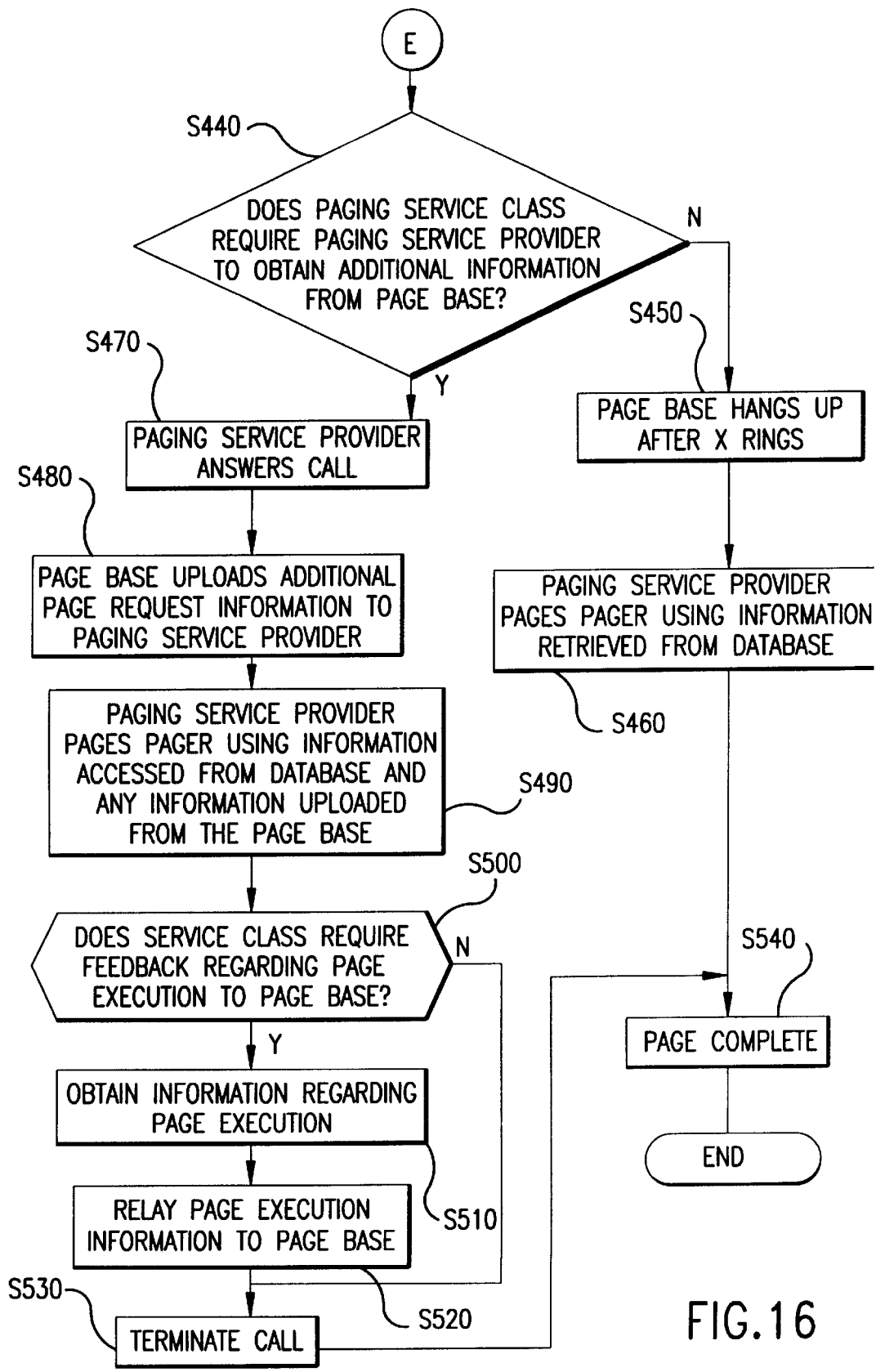
Figure 17:
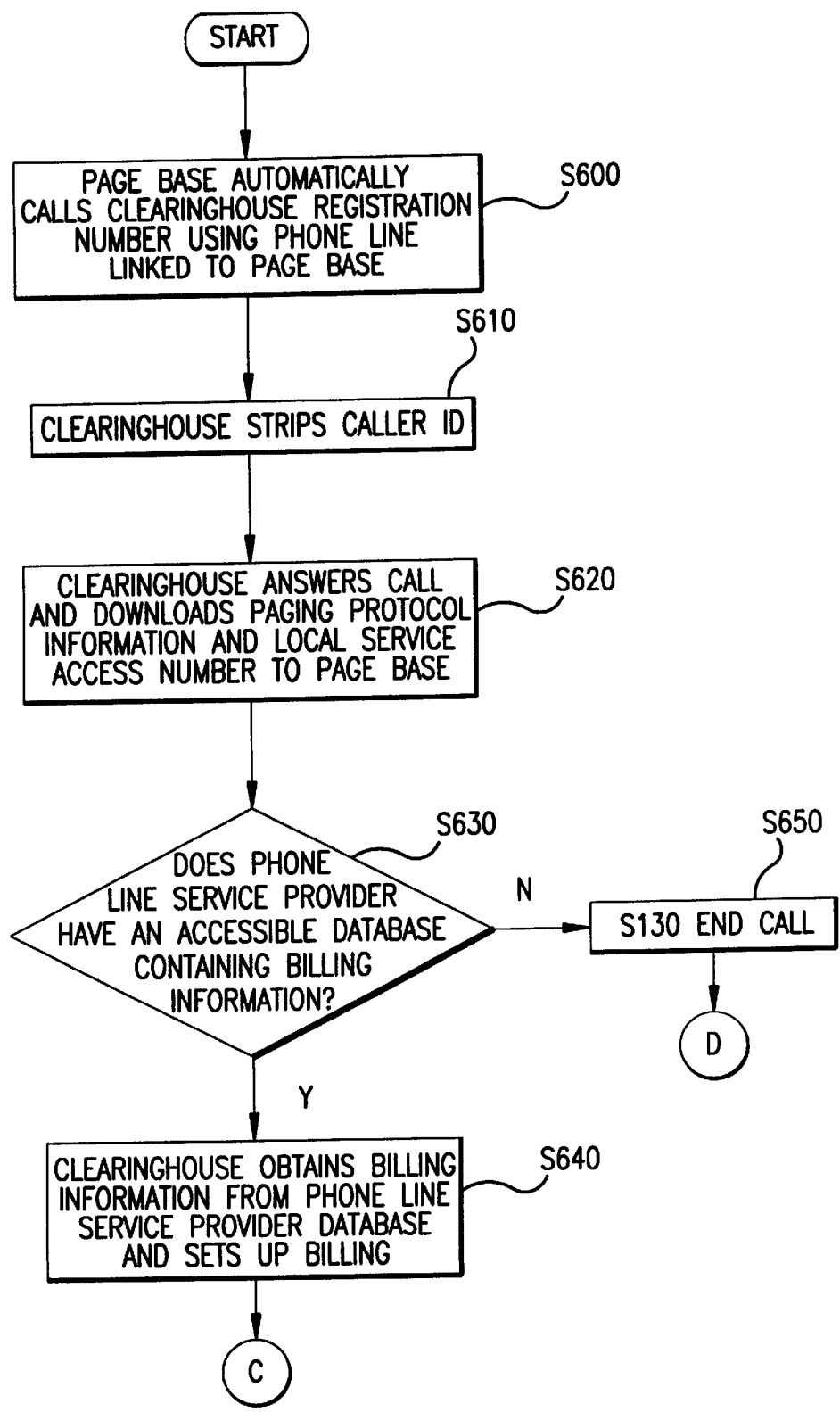
FIGS. 17–18 are a flowchart outlining a second method for automatically registering a dedicated pager system.

FIGS. 15–17 show a paging sequence for paging systems that have been registered according to one of the sequences shown in FIGS. 11–14.

In step S400, the user presses the page button 104. In response, in step S410, the page base 100 automatically dials the paging service provider local access number. In step S420, the paging service provider 1120 strips the caller ID, and then in step S430 uses the stripped caller ID to access the local access database 1106 and the customer record database 1108 to obtain the pager identification associated with the stripped caller ID, and any other information relevant to the page request, for example a predetermined information packet to be transferred to the pager 102 with the page signal.

Where the pager 102 has capability to receive and display alphanumeric text, the predetermined information packet could be, for example, the caller ID, a different telephone number set by the customer, or an alphanumeric message such as "call home".

In step S440, the paging service provider 1120 determines from information retrieved from the databases whether the class of service specifies that the page base 100 will upload additional information to the paging service provider 1120. If additional information is not required, control continues to step S450. When the service class indicates that no additional information is needed from the page base 100, the interface system 1170 never answers the call. Thus, in step S450, the page base 100 hangs up after a predetermined number of rings. Then, in step S460, the paging service provider 1120 pages the pager 102 using the information retrieved from the databases. Control then jumps to step 540 and the process is complete. This mode of operation is only possible when the caller ID signal provides the paging service provider with the caller identification as the line rings, so that the paging service provider does not need to actually answer the call. If, in step 440, additional information is needed, control jumps to step 470. In step 470, the paging service provider 1120 answers the call. Then, in step S480, the local service provider receives the information uploaded from the page base 100. In step 490, the paging service provider 1120 executes the page by sending the page and additional information to the pager 102 via a radio frequency signal. Note that the information uploaded from the page base 100 can be complete information (e.g., alphanumeric text) or can be a token. The token, or code, causes the paging service provider 1120 to select a message from a set of predetermined messages for transmission to the pager 102.

In step 500, the paging service provider 1120 determines whether the paging service class includes feedback to the page base regarding the status of the page request. If so, control continues to step S510, otherwise control jumps to step S530. In step S510, information is obtained regarding status of the page request. Then, in step S520, the information is relayed to the page base 100. The status information may include confirmation that the paging service provider 1120 received the page request, and confirmation whether the paging service provider 1120 actually executed the page. In addition, where the pager 102 has a reply capability, the status information could include confirmation that the pager 102 actually received the page, and even a message from the user of the pager 102 to the user of the page base 100.

After page status information is relayed to the page base 100 in step S510, control continues to step S530, where the call is terminated. In step S540, the page request sequence is complete.

Figure 18:
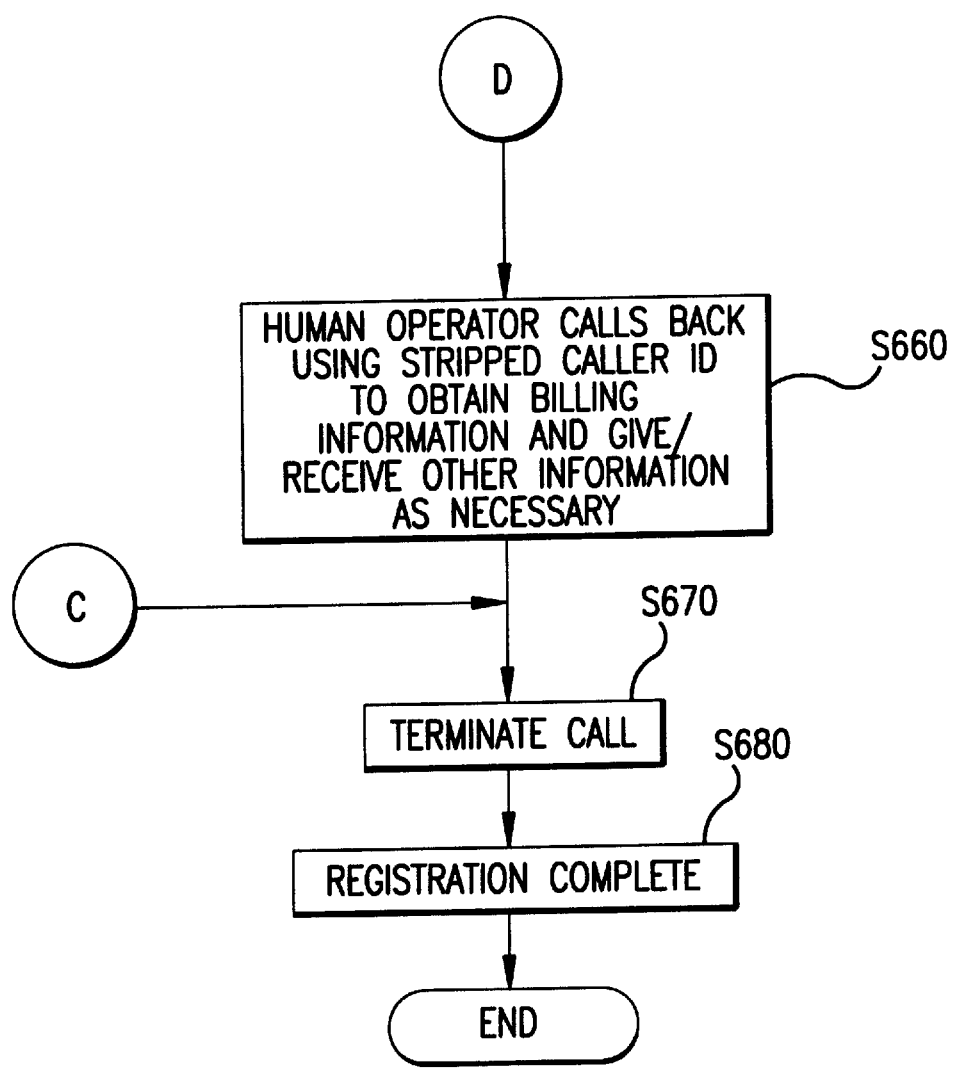

FIGS. 17–18 outline a registration sequence appropriate for the case where the paging service provider has a "dumb" or standard interface which is not aware that the source of the page is a single button pager. In this case, when the page button is pressed, the interface system within the page base 100 must do all the work to provide page request information to the service provider in a conventional fashion. This combination of an interface system and paging service provider has all the capabilities of the interface system 1170 and the paging service provider 1120 shown in FIG. 10, except that the combined system receives and processes page requests in a conventional manner.

The registration sequence is similar to that shown in FIGS. 11–12. In step S600, when the page button 104 is pressed, the clearinghouse registration number is automatically called. Then, in step S610, the interface system 1170 downloads not only the paging service provider local access number, but all other necessary codes and information that the page base would need to use in order automatically place a conventional page request. The nature of the interface system 1170 "greeting" to the page base 100 would indicate to the page base 100 that the registration would be for a conventional paging protocol, in contrast to a registration for paging service as according to, for example, the paging sequence outlined in FIGS. 15–16.

After the user presses the page button 104 of an unregistered page base 100, the page base 100 dials the registration number. In step S610, the clearinghouse strips the caller ID. Then in step S620, the clearinghouse answers the call and downloads all paging protocol information that the page base 100 must use when placing a page request.

In the remaining steps 630–680, processing of billing proceeds in a fashion similar to that described above with respect to FIGS. 15–16, and the registration process is complete.

Figure 19:
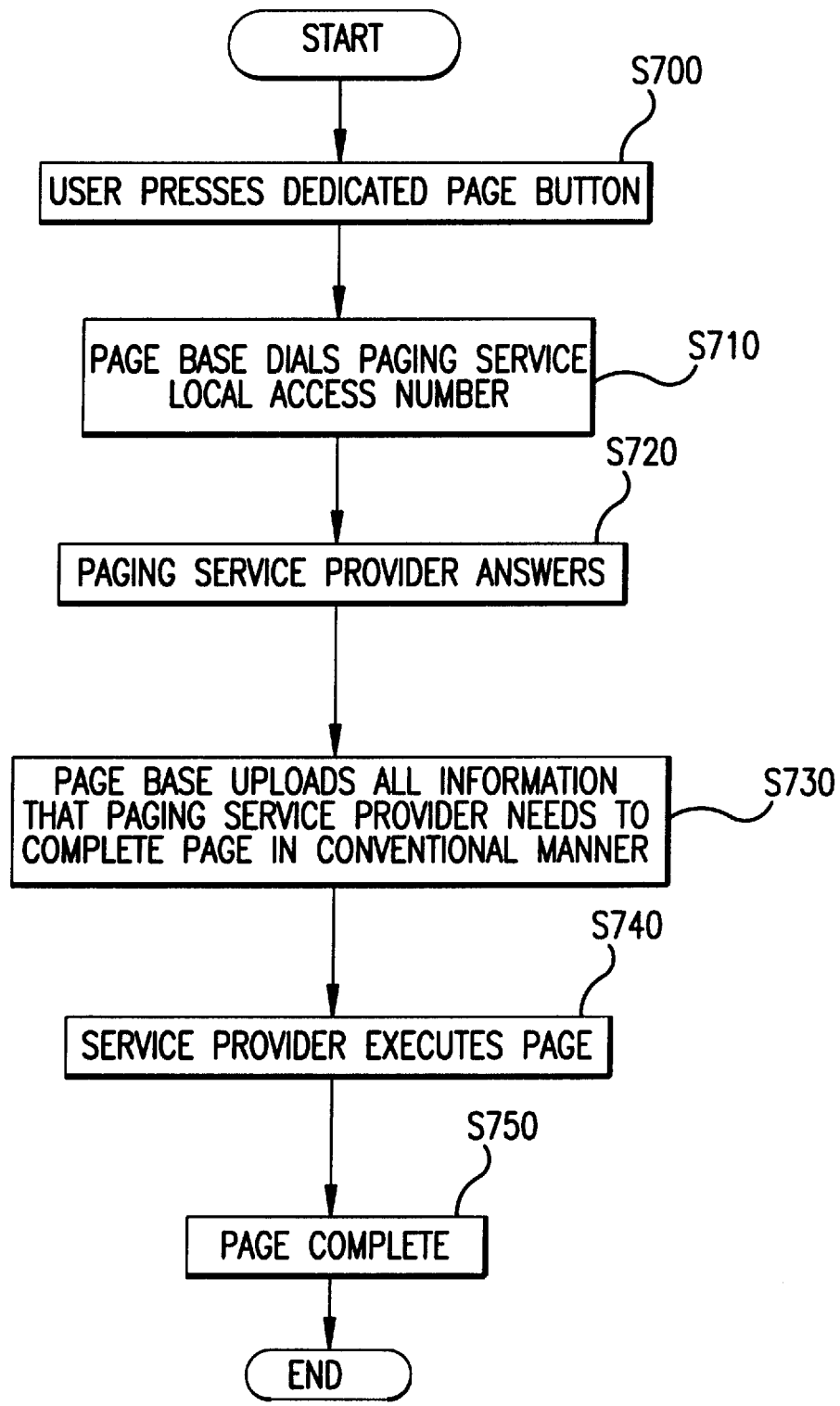
FIG. 19 is a flowchart outlining a method for requesting pages for dedicated pager systems registered according to the method shown in FIGS. 17–18.

FIG. 19 outlines a page request sequence for a page base 100 registered according to the sequence described above with respect to FIGS. 17–18.

In step S700, the user presses the page button 104 on the page base 100. In step S710, the page base 100 automatically dials the paging service provider local access number. In step S720, the interface system 1170 answers the call. Then in step S730, the page base 100 and the interface system engage in a conventional page request dialogue wherein the page base 100 uploads all information the interface system 1170 and the paging service provider 1120 need to process the page request in a conventional manner. In step S740, the service provider executes the page. Then, in step S750, the page request process is complete.

Those skilled in the art will recognize that specific implementations of pager system registration and paging depend in part upon respective capabilities of the dedicated pager 102 and base unit 100, and the paging service provider 1120 and the interface system 1170. Accordingly, features of the systems and embodiments described above may be variously combined to form paging systems consistent with the invention.

For example, where the page base 100 is to be used within a PBX system which requires a prefix numeral to be dialed in order to access an outside phone line, the system can be modified to automatically detect the presence of a PBX or a direct line and react accordingly. For example, when the page base 100 is first activated to begin the automatic registration sequence, the page base 100 first dials a "9", and then waits for two seconds to detect presence of a dial tone. If no dial tone is detected, then the page base 100 hangs up and repeats the sequence with an "8". If no dial tone is detected with these most common PBX prefixes, then a normal line is assumed and a PBX_Flag is cleared, a FLASH is generated, and the registration process is restarted with no prefix. Otherwise, if a dial tone were detected, then the flag would remain set and all future dial-outs would contain the prefix.

While this invention has been described in conjunction with the above-outlined specific embodiments thereof, it is evident that many alternatives, modifications and variations will be apparent to those skilled in the art. Accordingly, the preferred embodiments of the invention as set forth above are intended to be illustrative, not limiting. Various changes may be made without departing from the scope of the invention as defined in the following claims.

What is claimed is:

1. A dedicated paging system, comprising:
   a pager comprising a receiver and a memory for storing a predetermined pager identification code;
   a page base unit separable from the pager including:
   a page activation button for triggering an automatic paging process to page the pager,
   a first connector for connecting the page base unit to a public switched telephone network line,
   a memory for storing at least one of the pager identification code,
   a phone number for a paging service clearinghouse, a page base unit identification code, paging service class information, and a paging service provider access telephone number, and
   a phone call generating system connected to the page activation button, the memory, and the first connector, the phone call generating system including means for automatically calling the paging service provider when the page activation button is pressed to cause the pager to be paged.

2. The dedicated paging system of claim 1, wherein the page base unit further includes a sound generating circuit for providing information to a user of the page base unit.

3. The dedicated paging system of claim 2, wherein the sound generating circuit generates one of pulsing and continuous tones.

4. The dedicated paging system of claim 2, wherein the sound generating circuit comprises a voice synthesizer for generating speech messages.

5. The dedicated paging system of claim 1, wherein the page base unit further includes an LED display for providing information to a user of the page base unit.

6. The dedicated paging system of claim 1, wherein the page base unit further includes an LCD display for providing information to user of the page base unit.

7. The dedicated paging system of claim 1, wherein the page base unit further includes a control panel having at least one button, for controlling functions of the page base unit.

8. The dedicated paging system of claim 7, wherein the at least one button is a reset button for enabling the page base unit to re-register the dedicated paging system.

9. The dedicated paging system of claim 1, wherein the page base unit is incorporated into a telephone.

10. The dedicated paging system of claim 9, wherein the telephone is one of a mobile telephone and a cellular telephone.

11. The dedicated paging system of claim 1, further comprising:
a plurality of pagers; and
a plurality of page activation buttons, wherein each one of the plurality of page activation buttons is associated with a corresponding one of the plurality of pagers.

12. The dedicated paging system of claim 1, wherein the memory stores information downloaded to the page base unit via the public switched telephone network line.

13. The dedicated paging system of claim 1, wherein the page base unit includes a second connector for connecting the page base unit to a telephone.

14. The dedicated paging system of claim 13, wherein the telephone is a touch tone telephone, and wherein the memory stores information entered into the page base unit via the touch tone telephone.

15. The dedicated paging system of claim 1, wherein the page base unit further includes a receptacle formed in the page base unit for receiving a card containing electronic information, wherein the page base unit reads information from the card when the card is in the receptacle.

16. The dedicated paging system of claim 15, wherein the electronic information contained in the card comprises at least one of the pager identification code,
the phone number for the paging service clearinghouse, the page base unit identification code, and the paging service class information.

17. The dedicated paging system of claim 16, wherein the paging service class information defines the geographical area over which paging service will be provided.

18. A method for automatically registering a dedicated pager system with a paging service clearinghouse, the dedicated pager system comprising a pager and a page base separable from the pager having a dedicated page button and a memory storing a telephone number for the paging service clearinghouse and an identification code for the pager, the method comprising:
pressing the dedicated page button;
automatically dialing the clearinghouse by a phone call generating system using the paging service clearinghouse telephone number stored in the memory;
upon the clearinghouse answering the call from the page base, transmitting the pager identification code stored in the memory to the clearinghouse; and
receiving from the clearinghouse all protocol information necessary for the page base to automatically generate a page from a paging service provider to the dedicated pager, wherein the protocol information includes a paging service provider access number.

19. The method of claim 18, further comprising:
receiving a line-pickup signal from the paging service clearinghouse; and
alerting a user to pick up a telephone connected to the page base,
wherein the user then talks with a human operator at the clearinghouse to exchange information necessary to complete the registering of the dedicated pager system.

20. The method of claim 18, further comprising pressing keys on a touch tone phone to transmit information to the clearinghouse via touch tones.

21. A method for automatically registering a dedicated pager system with a paging service clearinghouse, the dedicated pager system comprising a pager and a page base separable from the pager having a dedicated page button and a memory storing a telephone number for the paging service clearinghouse and an identification code for the pager, the method comprising:
receiving a call from the page base;
answering the call;
requesting the pager identification code; and
transmitting to the page base paging protocol information that the page base must use to request a page for the pager.

22. The method of claim 21, further comprising:
determining a caller ID of the call;
storing the caller ID and the pager identification code in a paging service provider database;
determining whether a telecommunications company, servicing a public switched telephone network line telephone number from which the page base called, has a billing information database accessible to the clearinghouse; and
if the billing information database is accessible, obtaining billing information from the billing information database, and
setting up a billing mechanism based on the obtained billing information.

23. The method of claim 22, further comprising:
causing a human operator to obtain additional information necessary to complete the registration.

24. The method of claim 23, wherein causing the human operator to obtain additional information includes causing the human operator to obtain at least one of billing information and service class information.

25. The method of claim 24, wherein the billing information includes credit card information.

26. A method for automatically registering a dedicated pager system, the system comprising a page base separable from the pager having a dedicated page button and a memory for storing a telephone number for a clearinghouse and a pager identification code, a pager, and the clearinghouse, the method comprising:
the page base automatically calling the clearinghouse by a phone call generating system using the clearinghouse telephone number stored in memory;
the clearinghouse answering the incoming call from the page base;
uploading the pager identification code from the page base to the clearinghouse; and downloading from the clearinghouse to the page base all protocol information necessary for the page base to automatically request a page from a paging service provider.

27. The method of claim 26, further comprising determining the caller ID of the call.

28. A method for automatically placing a page request to a dedicated pager using a dedicated pager system, the system comprising a page base having a dedicated page button and a memory for storing a paging service provider access telephone number and an identification number of the dedicated pager, the dedicated pager, and a paging service provider having a database containing a) a caller identification number of a telephone line used by the page base, b) the identification number of the dedicated pager, and c) a logical link between the caller identification number and the pager identification number, the method comprising:

pressing the dedicated page button;

automatically calling the paging service provider by a phone call generating system using the stored access telephone number;

stripping the caller identification number from the incoming call from the page base;

retrieving the pager identification number from the database using the stripped caller identification number; and sending a page signal to the pager using the pager identification number.

29. The method of claim 28, further comprising terminating the call after a predetermined number of rings.

30. A method for automatically placing a page request to a dedicated pager using a dedicated pager system, the system comprising the pager, a page base separable from the pager having a dedicated page button and a memory storing all information necessary for placing a page request with a paging service provider, and the paging service provider, the method comprising:

pressing the dedicated page button on the page base;

using information stored in the semi-permanent memory to call the paging service provider; and automatically uploading to the paging service provider from the memory all information necessary for the paging service provider to execute the page request.

31. The method of claim 30, wherein uploading the information comprises automatically conveying information to the paging service provider using a conventional paging dialogue.

32. The method of claim 30, further comprising receiving status information from the page service provider regarding the page request.

33. The method of claim 30, wherein the uploaded information comprises message to be transmitted to the pager.

34. The method of claim 30, wherein the uploaded information comprises a token representing a predetermined message to be transmitted to the pager.

35. A method for automatically placing a page request to a dedicated pager using a dedicated pager system, the system comprising the pager and a page base separable from the pager having a dedicated page button and a memory storing all information necessary for placing a page request with a paging service provider, the paging service provider having a database, the method comprising:

receiving a call from the page base;

determining the caller ID of the call;

using the caller ID to retrieve the pager identification code from the database; and automatically paging the pager utilizing the pager identification code.

36. The method of claim 35, further comprising:

answering the call;

receiving message information from the page base; and transmitting the message information to the pager.

37. The method of claim 35, further comprising transmitting page request status information to the page base.

38. The method of claim 35, further comprising receiving a page confirmation signal from the pager.

39. The dedicated paging system according to claim 1, wherein the phone call generating system automatically calls a clearinghouse to register the dedicated paging system.

40. The dedicated paging system according to claim 1, wherein the base unit is automatically registered upon pressing the page activation button.

41. The dedicated paging system according to claim 1, wherein the pager automatically receives a page when the page activation button is pressed.

42. The method according to claim 18, wherein subsequent pressing of the dedicated page button causes dedicated paging of the pager, whereby the dedicated pager receives a page.

* * * * *